(12) United States Patent
Li

(10) Patent No.: US 10,798,202 B2
(45) Date of Patent: *Oct. 6, 2020

(54) SECURITY SYSTEMS FOR MITIGATING ATTACKS FROM A HEADLESS BROWSER EXECUTING ON A CLIENT COMPUTER

(71) Applicant: Shape Security, Inc., Mountain View, CA (US)

(72) Inventor: Zhiwei Li, Mountain View, CA (US)

(73) Assignee: Shape Security, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/457,589

(22) Filed: Jun. 28, 2019

(65) Prior Publication Data

US 2019/0327325 A1    Oct. 24, 2019

Related U.S. Application Data

(63) Continuation of application No. 15/968,573, filed on May 1, 2018, now Pat. No. 10,367,903, which is a
(Continued)

(51) Int. Cl.
| | | |
|---|---|---|
| H04L 29/08 | (2006.01) | |
| H04L 29/06 | (2006.01) | |
| G06F 21/56 | (2013.01) | |

(52) U.S. Cl.
CPC ........ *H04L 67/2819* (2013.01); *G06F 21/566* (2013.01); *H04L 63/1466* (2013.01);
(Continued)

(58) Field of Classification Search
CPC .............. H04L 67/2819; H04L 21/566; H04L 63/1466; H04L 63/168
See application file for complete search history.

(56) References Cited

U.S. PATENT DOCUMENTS

| 5,509,076 A | 4/1996 | Sprunk |
|---|---|---|
| 6,654,707 B2 | 11/2003 | Wynn |

(Continued)

FOREIGN PATENT DOCUMENTS

| CN | 101471818 | 5/2011 |
|---|---|---|
| WO | WO2000/72119 | 11/2000 |

(Continued)

OTHER PUBLICATIONS

NOA, mailed on Feb. 7, 2019, re: Siying Yang, U.S. Appl. No. 16/190,015, filed Nov. 13, 2018.
(Continued)

*Primary Examiner* — Shanto Abedin
(74) *Attorney, Agent, or Firm* — Troutman Pepper Hamilton Sanders LLP (Rochester)

(57) ABSTRACT

Computer systems and methods in various embodiments are configured for improving the security and efficiency of server computers interacting through an intermediary computer with client computers that may be executing malicious and/or autonomous headless browsers or "bots". In an embodiment, a computer system comprises a memory; one or more processors coupled to the memory; a processor logic coupled to the memory and the one or more processors, and configured to: intercept, from a server computer, one or more original instructions to be sent to a browser of a client computer; send the one or more original instructions to the browser and one or more telemetry instructions, wherein the telemetry instructions are configured, when executed, to generate a set of telemetry data indicating one or more objects that were referenced by the browser and to send the set of telemetry data to the intermediary computer; receive the set of telemetry data and determine whether the browser is legitimate or illegitimate based on the set of telemetry data.

20 Claims, 5 Drawing Sheets

Related U.S. Application Data continuation of application No. 14/718,736, filed on May 21, 2015, now Pat. No. 9,986,058.

(52) U.S. Cl.
CPC .... *H04L 63/168* (2013.01); *G06F 2221/2133* (2013.01); *H04L 67/02* (2013.01)

(56) References Cited

U.S. PATENT DOCUMENTS

| | | |
|---|---|---|
| 7,058,699 B1 | 6/2006 | Chiou |
| 7,107,347 B1 | 9/2006 | Cohen |
| 7,107,596 B2 | 9/2006 | Brown |
| 7,117,429 B2 | 10/2006 | Vedullapalli |
| 7,398,553 B1 | 7/2008 | Li |
| 7,424,720 B2 | 9/2008 | Chagoly |
| 7,464,326 B2 | 12/2008 | Kawai |
| 7,472,413 B1 | 12/2008 | Mowshowitz |
| 7,802,298 B1* | 9/2010 | Hong ............... G06F 21/51 705/51 |
| 7,849,502 B1 | 12/2010 | Bloch et al. |
| 7,870,610 B1 | 1/2011 | Mitchell |
| 7,895,653 B2 | 2/2011 | Calo |
| 8,086,756 B2 | 12/2011 | Kamyshenko |
| 8,086,957 B2 | 12/2011 | Bauchot |
| 8,170,020 B2 | 5/2012 | Oliver |
| 8,181,104 B1 | 5/2012 | Helfand et al. |
| 8,195,953 B1 | 6/2012 | Yue |
| 8,453,126 B1 | 5/2013 | Ganelin |
| 8,533,480 B2 | 9/2013 | Pravetz |
| 8,555,388 B1 | 10/2013 | Wang |
| 8,561,193 B1 | 10/2013 | Srivastava |
| 8,578,499 B1 | 11/2013 | Zhu |
| 8,589,405 B1 | 11/2013 | Estan |
| 8,615,804 B2 | 12/2013 | Mui |
| 8,621,197 B2 | 12/2013 | Suryanarayana |
| 8,650,648 B2 | 2/2014 | Howard et al. |
| 8,677,481 B1 | 3/2014 | Lee |
| 8,689,330 B2 | 4/2014 | Sinn |
| 8,713,631 B1 | 4/2014 | Pavlyushchik |
| 8,713,684 B2 | 4/2014 | Bettini |
| 8,726,394 B2 | 5/2014 | Maor |
| 8,739,284 B1 | 5/2014 | Gardner |
| 8,752,208 B2 | 6/2014 | Shulman |
| 8,762,962 B2 | 6/2014 | Ben-Artzi |
| 8,843,820 B1 | 9/2014 | Kay |
| 8,849,985 B1 | 9/2014 | Colton |
| 8,869,281 B2 | 10/2014 | Call |
| 8,954,583 B1* | 2/2015 | Zhou ............... G06F 9/30181 709/224 |
| 8,997,226 B1* | 3/2015 | Call ............... G06F 21/552 726/22 |
| 9,043,924 B2 | 5/2015 | Maor |
| 9,158,893 B2 | 10/2015 | Call |
| 9,225,729 B1 | 12/2015 | Moen |
| 9,225,737 B2 | 12/2015 | Call |
| 9,258,328 B2 | 2/2016 | Ibatullin et al. |
| 9,338,143 B2 | 5/2016 | Hansen |
| 9,356,954 B2 | 5/2016 | Zhou |
| 9,456,050 B1 | 9/2016 | Lepeska |
| 9,537,888 B1 | 1/2017 | McClintock |
| 9,609,006 B2 | 3/2017 | Call |
| 9,628,498 B1 | 4/2017 | Aziz |
| 9,639,699 B1 | 5/2017 | Kurupati |
| 9,646,140 B2 | 5/2017 | Horadan |
| 9,680,850 B2 | 6/2017 | Rapaport |
| 9,686,300 B1 | 6/2017 | Kurupati |
| 9,705,902 B1 | 7/2017 | Call |
| 9,712,561 B2 | 7/2017 | Zhou |
| 9,906,544 B1 | 2/2018 | Kurupati |
| 10,044,753 B2 | 8/2018 | Zhou |
| 10,165,004 B1 | 12/2018 | Mehta |
| 2002/0194219 A1 | 12/2002 | Bradley |
| 2002/0199116 A1 | 12/2002 | Hoene |
| 2004/0088651 A1 | 5/2004 | McKnight |
| 2005/0108554 A1 | 5/2005 | Rubin |
| 2005/0172338 A1 | 8/2005 | Sandu |
| 2005/0198099 A1 | 9/2005 | Motsinger |
| 2005/0216770 A1 | 9/2005 | Rowett |
| 2005/0240999 A1 | 10/2005 | Rubin |
| 2005/0251536 A1 | 11/2005 | Harik |
| 2005/0278626 A1 | 12/2005 | Malik |
| 2006/0053295 A1 | 3/2006 | Madhusudan |
| 2006/0101047 A1 | 5/2006 | Rice |
| 2006/0174323 A1 | 8/2006 | Brown |
| 2006/0195588 A1 | 8/2006 | Pennington |
| 2006/0230288 A1 | 10/2006 | Fox |
| 2006/0288418 A1 | 12/2006 | Yang |
| 2007/0011295 A1 | 1/2007 | Hansen |
| 2007/0064617 A1 | 3/2007 | Reves |
| 2007/0074227 A1 | 3/2007 | Naidu |
| 2007/0088955 A1 | 4/2007 | Lee |
| 2007/0150568 A1 | 6/2007 | Ruiz |
| 2007/0234070 A1 | 10/2007 | Horning |
| 2008/0208785 A1 | 8/2008 | Trefler |
| 2008/0320567 A1 | 12/2008 | Shulman |
| 2009/0070459 A1 | 3/2009 | Cho |
| 2009/0099988 A1 | 4/2009 | Stokes |
| 2009/0199297 A1 | 8/2009 | Jarrett |
| 2009/0241174 A1 | 9/2009 | Rajan |
| 2009/0292791 A1 | 11/2009 | Livshits |
| 2009/0292984 A1 | 11/2009 | Bauchot |
| 2010/0088404 A1 | 4/2010 | Mani |
| 2010/0106611 A1 | 4/2010 | Paulsen |
| 2010/0142382 A1 | 6/2010 | Jungck et al. |
| 2010/0186089 A1 | 7/2010 | Fu |
| 2010/0218253 A1 | 8/2010 | Andrew |
| 2010/0235637 A1 | 9/2010 | Lu |
| 2010/0235910 A1 | 9/2010 | Ku |
| 2010/0251128 A1 | 9/2010 | Cordasco |
| 2010/0287132 A1* | 11/2010 | Hauser .................. G06F 40/174 706/52 |
| 2011/0035733 A1 | 2/2011 | Horning |
| 2011/0107077 A1 | 5/2011 | Henderson |
| 2011/0154308 A1 | 6/2011 | Lobo |
| 2011/0225234 A1 | 9/2011 | Amit |
| 2011/0231305 A1 | 9/2011 | Winters |
| 2011/0255689 A1 | 10/2011 | Bolotov |
| 2011/0307954 A1 | 12/2011 | Melnik |
| 2011/0320816 A1 | 12/2011 | Yao |
| 2012/0036576 A1 | 2/2012 | Iyer |
| 2012/0090030 A1 | 4/2012 | Rapaport |
| 2012/0198528 A1 | 8/2012 | Baumhof |
| 2012/0216251 A1 | 8/2012 | Kumar |
| 2012/0254727 A1 | 10/2012 | Jain |
| 2012/0255006 A1 | 10/2012 | Aly et al. |
| 2012/0324236 A1 | 12/2012 | Srivastava |
| 2013/0047255 A1 | 2/2013 | Dalcher |
| 2013/0086679 A1 | 4/2013 | Beiter |
| 2013/0091582 A1 | 4/2013 | Kellerman |
| 2013/0219256 A1 | 8/2013 | Lloyd |
| 2013/0219492 A1 | 8/2013 | Call |
| 2013/0227397 A1 | 8/2013 | Tvorun |
| 2013/0239195 A1 | 9/2013 | Turgeman |
| 2013/0263264 A1 | 10/2013 | Klein |
| 2013/0273882 A1 | 10/2013 | Walsh |
| 2013/0340043 A1 | 12/2013 | Zarei |
| 2014/0040051 A1 | 2/2014 | Ovick |
| 2014/0040787 A1 | 2/2014 | Mills |
| 2014/0096194 A1 | 4/2014 | Bhogavilli |
| 2014/0101236 A1 | 4/2014 | Dietrich |
| 2014/0208198 A1 | 7/2014 | Ayoub |
| 2014/0244830 A1 | 8/2014 | Smacinih |
| 2014/0282872 A1 | 9/2014 | Hansen |
| 2014/0283069 A1 | 9/2014 | Call |
| 2014/0298469 A1 | 10/2014 | Marion |
| 2014/0304816 A1* | 10/2014 | Klein ............... G06F 21/56 726/23 |
| 2014/0310392 A1 | 10/2014 | Ho |
| 2014/0359571 A1 | 12/2014 | Sasikumar |
| 2015/0058992 A1 | 2/2015 | El-Moussa |
| 2015/0067031 A1 | 3/2015 | Acharya |
| 2015/0067866 A1 | 3/2015 | Ibatullin |

(56) References Cited

U.S. PATENT DOCUMENTS

| | | | |
|---|---|---|---|
| 2015/0112892 A1* | 4/2015 | Kaminsky | H04L 63/1416 706/11 |
| 2015/0256556 A1 | 9/2015 | Kaminsky | |
| 2015/0262183 A1 | 9/2015 | Gervais | |
| 2015/0278491 A1 | 10/2015 | Horning | |
| 2015/0281263 A1 | 10/2015 | McLaughlin | |
| 2015/0358338 A1 | 12/2015 | Zeitlin | |
| 2015/0379266 A1 | 12/2015 | McLaughlin | |
| 2016/0005029 A1 | 1/2016 | Ivey | |
| 2016/0072829 A1 | 3/2016 | Call | |
| 2016/0119344 A1 | 4/2016 | Freitas Fortuna dos Santos | |
| 2016/0191554 A1 | 6/2016 | Kaminsky | |
| 2016/0342793 A1 | 11/2016 | Hidayat | |
| 2016/0344769 A1 | 11/2016 | Li | |
| 2016/0378989 A1 | 12/2016 | Park | |
| 2017/0012960 A1 | 1/2017 | Idika | |
| 2017/0013012 A1 | 1/2017 | Hansen | |
| 2017/0048260 A1 | 2/2017 | Peddemors | |
| 2017/0178778 A1 | 6/2017 | Zhang | |
| 2017/0201540 A1 | 7/2017 | Call | |
| 2017/0235954 A1 | 8/2017 | Kurupati | |
| 2017/0237766 A1 | 8/2017 | Mattson | |
| 2017/0257383 A1 | 9/2017 | Ficarra | |
| 2017/0257385 A1 | 9/2017 | Overson | |
| 2017/0293748 A1 | 10/2017 | Kurupati | |
| 2018/0041527 A1 | 2/2018 | Call | |
| 2018/0205747 A1 | 7/2018 | Ficarra | |
| 2018/0212993 A1 | 7/2018 | Call | |
| 2018/0227325 A1 | 8/2018 | Zhou | |
| 2018/0255154 A1 | 9/2018 | Li | |
| 2018/0270256 A1 | 9/2018 | Call | |
| 2019/0081977 A1 | 3/2019 | Yang | |
| 2019/0141064 A1 | 5/2019 | Call | |
| 2019/0182251 A1 | 6/2019 | Jampani | |
| 2019/0215304 A1 | 7/2019 | Yang | |
| 2019/0243971 A1 | 8/2019 | Call | |
| 2019/0245858 A1 | 8/2019 | Idika | |
| 2019/0268359 A1 | 8/2019 | Zhang | |
| 2019/0327265 A1 | 10/2019 | Zhao | |
| 2019/0364019 A1 | 11/2019 | Yang | |
| 2019/0373012 A1 | 12/2019 | Mattson | |
| 2019/0394228 A1 | 12/2019 | Yang | |

FOREIGN PATENT DOCUMENTS

| | | |
|---|---|---|
| WO | WO2002/093369 | 11/2002 |
| WO | WO2008/095018 | 8/2008 |
| WO | WO2008/095031 | 8/2008 |
| WO | WO2008/130946 | 10/2008 |
| WO | WO 2017/007705 | 1/2017 |
| WO | WO 2017/007936 | 1/2017 |
| WO | WO 2017/074622 | 5/2017 |

OTHER PUBLICATIONS

NOA, mailed on Feb. 16, 2017, re: Justin D. Call, U.S. Appl. No. 14/822,287, filed Aug. 10, 2015.
NOA, mailed on Mar. 2, 2017, re: Justin D. Call, U.S. Appl. No. 14/930,198, filed Nov. 2, 2015.
NOA, mailed on Mar. 10, 2017, re: Roger S. Hoover, U.S. Appl. No. 14/470,082, filed Aug. 27, 2014.
CTNF, mailed on Mar. 9, 2017, re: Siying Yang, U.S. Appl. No. 14/925,547, filed Oct. 28, 2015.
NOA, mailed on Apr. 23, 2015, re: Justin Call, U.S. Appl. No. 13/527,025, filed Jun. 19, 2012.
CTFR, mailed on Feb. 10, 2015, re: Justin Call, U.S. Appl. No. 13/527,025, filed Jun. 19, 2012.
CTNF, mailed on Nov. 2, 2012, re: Justin Call, U.S. Appl. No. 13/527,025, filed Jun. 19, 2012.
CTFR, mailed on Apr. 23, 2013, re: Justin Call, U.S. Appl. No. 13/527,025, filed Jun. 19, 2012.
CTNF, mailed on Aug. 4, 2014, re: Justin Call, U.S. Appl. No. 13/527,025, filed Jun. 19, 2012.
NOA, mailed on Jun. 1, 2015, re: Justin Call, U.S. Appl. No. 13/527,025, filed Jun. 19, 2012.
CTNF, mailed on Feb. 26, 2015, re: Justin Call, U.S. Appl. No. 14/055,576, filed Oct. 16, 2013.
NOA, mailed on Aug. 21, 2015, re: Justin Call, U.S. Appl. No. 14/055,576, filed Oct. 16, 2013.
CTNF, mailed on Dec. 24, 2014, re: Justin Call, U.S. Appl. No. 14/055,583, filed Oct. 16, 2013.
NOA, mailed on Jun. 19, 2015, re: Justin Call, U.S. Appl. No. 14/055,583, filed Oct. 16, 2013.
CTNF, mailed on Dec. 24, 2013, re: Justin Call, U.S. Appl. No. 14/055,646, filed Oct. 16, 2013.
CTFR, mailed on May 27, 2014, re: Justin Call, U.S. Appl. No. 14/055,646, filed Oct. 16, 2013.
NOA, mailed on Aug. 12, 2014, re: Justin Call, U.S. Appl. No. 14/055,646, filed Oct. 16, 2013.
NOA, mailed on Sep. 4, 2014, re: Justin Call, U.S. Appl. No. 14/055,646, filed Oct. 16, 2013.
CTFR, mailed on Apr. 9, 2015, re: Justin Call, U.S. Appl. No. 14/055,704, filed Oct. 16, 2013.
CTNF, mailed on Dec. 4, 2014, re: Justin Call, U.S. Appl. No. 14/055,704, filed Oct. 16, 2013.
CTNF, mailed on Dec. 30, 2013, re: Justin Call, U.S. Appl. No. 14/055,704, filed Oct. 16, 2013.
CTFR, mailed on Apr. 22, 2014, re: Justin Call, U.S. Appl. No. 14/055,704, filed Oct. 16, 2013.
CTFR, mailed on Sep. 25, 2015, re: Marc Hansen, U.S. Appl. No. 14/055,714, filed Oct. 16, 2013.
CTNF, mailed on Mar. 16, 2015, re: Marc Hansen, U.S. Appl. No. 14/055,714, filed Oct. 16, 2013.
NOA, mailed on Jan. 13, 2016, re: Marc Hansen, U.S. Appl. No. 14/055,714, filed Oct. 16, 2013.
CTNF, mailed on Apr. 20, 2015, re: Justin Call, U.S. Appl. No. 14/110,659, filed Oct. 8, 2013.
NOA, mailed on Aug. 19, 2015, re: Daniel Moen, U.S. Appl. No. 14/160,107, filed Jan. 21, 2014.
CTNF, mailed on Jun. 27, 2014, re: Justin Call, U.S. Appl. No. 14/255,248, filed Apr. 17, 2014.
NOA, mailed on Nov. 19, 2014, re: Justin Call, U.S. Appl. No. 14/255,248, filed Apr. 17, 2014.
NOA, mailed on Dec. 24, 2014, re: Justin Call, U.S. Appl. No. 14/255,248, filed Apr. 17, 2014.
CTNF, mailed on Sep. 1, 2015, re: Ariya Hidayat, U.S. Appl. No. 14/293,895, filed Jun. 2, 2014.
NOA, mailed on Mar. 30, 2016, re: Ariya Hidayat, U.S. Appl. No. 14/293,895, filed Jun. 2, 2014.
CTNF, mailed on Jun. 24, 2016, re: Roger Hoover, U.S. Appl. No. 14/470,082, filed Aug. 27, 2014.
CTNF, mailed on Aug. 28, 2015, re: Roger Hoover, U.S. Appl. No. 14/470,082, filed Aug. 27, 2014.
NOA, mailed on Jul. 21, 2016, re: Siying Yang, U.S. Appl. No. 14/541,062, filed Nov. 13, 2014.
CTNF, mailed on Feb. 23, 2016, re: Siying Yang, U.S. Appl. No. 14/541,062, filed Nov. 13, 2014.
CTNF, mailed on May 8, 2015, re: Timothy Peacock, U.S. Appl. No. 14/570,632, filed Dec. 15, 2014.
NOA, mailed on Dec. 18, 2015, re: Timothy Peacock, U.S. Appl. No. 14/570,632, filed Dec. 15, 2014.
CTNF, mailed on Mar. 17, 2016, re: Justin Call, U.S. Appl. No. 14/672,879, filed Mar. 30, 2015.
CTNF, mailed on Nov. 10, 2016, re: Nwokedi !dike, U.S. Appl. No. 14/728,621, filed Jun. 2, 2015.
CTNF, mailed on Jul. 18, 2016, re: Justin Call, U.S. Appl. No. 14/822,287, filed Aug. 10, 2015.
CTNF, mailed on Mar. 14, 2016, re: Justin Call, U.S. Appl. No. 14/874,717, filed Oct. 5, 2015.
NOA, mailed on Apr. 28, 2016, re: Justin Call, U.S. Appl. No. 14/874,717, filed Oct. 5, 2015.
NOA, mailed on Nov. 9, 2016, re: Justin Call, U.S. Appl. No. 14/930,198, filed Nov. 2, 2015.
CTNF, mailed on Jul. 21, 2016, re: Justin Call, U.S. Appl. No. 14/930,198, filed Nov. 2, 2015.

(56) References Cited

OTHER PUBLICATIONS

NOA, mailed on Nov. 16, 2016, re: Justin Call, U.S. Appl. No. 14/980,409, filed Dec. 28, 2015.
CTNF, mailed on Aug. 2, 2016, re: Justin Call, U.S. Appl. No. 14/980,409, filed Dec. 28, 2015.
CTNF, mailed on Dec. 16, 2016, re: Marc Hansen, U.S. Appl. No. 15/148,139, filed May 6, 2016.
CTFR, mailed on Nov. 18, 2016, re: Justin D. Call, U.S. Appl. No. 14/672,879, filed Mar. 30, 2015.
CTNF, mailed on Jun. 1, 2017, re: Siying Yang, U.S. Appl. No. 14/942,769, filed Nov. 16, 2015.
NOA, mailed on Jun. 7, 2017, re: Call, et al., U.S. Appl. No. 14/930,198, filed Jun. 7, 2017.
CTNF, mailed on Jun. 2, 2017, re: Ariya Hidayat, U.S. Appl. No. 15/224,978, filed Aug. 1, 2016.
CTNF, mailed on Apr. 7, 2017, re: Yao Zhao, U.S. Appl. No. 14/861,906, filed Sep. 22, 2015.
CTNF, mailed on May 25, 2017, re: Daniel G. Moen, U.S. Appl. No. 14/980,231, filed Dec. 28, 2015.
NOA, mailed on Jun. 20, 2017, re: Roger S. Hoover, U.S. Appl. No. 14/470,082, filed Aug. 27, 2014.
CTNF, mailed on Jul. 26, 2017, re: Bei Zhang, U.S. Appl. No. 14/859,084, filed Sep. 18, 2015.
CTNF, mailed on Jun. 21, 2017, re: Zhiwei Li, U.S. Appl. No. 14/718,736, filed May 21, 2015.
CTFR, mailed on Aug. 14, 2017, re: Marc R. Hansen, U.S. Appl. No. 15/148,139, filed May 6, 2016.
CTNF, mailed on Aug. 30, 2017, re: Justin D. Call, U.S. Appl. No. 15/470,715, filed May 27, 2017.
CTFR, mailed on Sep. 5, 2017, re: Siying Yang, U.S. Appl. No. 14/925,547, filed Oct. 28, 2015.
NOA, mailed on Oct. 11, 2017, re: James D. Call, U.S. Appl. No. 14/822,287, filed Aug. 10, 2015.
NOA, mailed on Oct. 18, 2017, re: Roger S. Hoover, U.S. Appl. No. 14/470,082, filed Aug. 27, 2014.
CTNF, mailed on Oct. 19, 2017, re: Jarrod S. Overson, U.S. Appl. No. 15/059,080, filed Mar. 2, 2016.
CTNF, mailed on Oct. 19, 2017, re: Wesley Hales, U.S. Appl. No. 15/011,237, filed Jan. 29, 2016.
NOA, mailed on Oct. 25, 2017, re: Michael J. Ficarra, U.S. Appl. No. 15/060,322, filed Mar. 3, 2016.
CTNF, mailed on Nov. 13, 2017, re: Nwokedi Idika, U.S. Appl. No. 14/728,596, filed Jun. 2, 2015.
CTNF, mailed on Dec. 13, 2017, re: Justin D. Call, U.S. Appl. No. 15/645,787, filed Jul. 10, 2017.
NOA, mailed on Dec. 18, 2017, re: Yao Zhao, U.S. Appl. No. 14/861,906, filed Sep. 22, 2015.
NOA, mailed on Jan. 5, 2018, re: Yao Zhao, U.S. Appl. No. 14/861,906, filed Sep. 22, 2015.
NOA, mailed on Jan. 9, 2018, re: Justin D. Call, U.S. Appl. No. 15/470,715, filed Mar. 27, 2017.
NOA, mailed on Jan. 16, 2018, re: Justin D. Call, U.S. Appl. No. 14/822,287, filed Aug. 10, 2015.
CTFR, mailed on Jan. 25, 2018, re: Siying Yang, U.S. Appl. No. 14/942,769, filed Nov. 16, 2015.
CTNF, mailed on Feb. 7, 2017, re: Daniel G. Moen, U.S. Appl. No. 14/980,231, filed Dec. 28, 2015.
CTFR, mailed on Jan. 10, 2018, re: Bei Zhang, U.S. Appl. No. 14/859,084, filed Sep. 18, 2015.
NOA, mailed on Jan. 25, 2018, re: Zhiwei Li, U.S. Appl. No. 14/718,736, filed May 21, 2015.
CTNF, mailed on Feb. 8, 2018, re: Xiaoming Zhou, U.S. Appl. No. 15/651,303, filed Jul. 17, 2017.
CTNF, mailed on Mar. 5, 2018, re: Justin D. Call, U.S. Appl. No. 15/785,309, filed Oct. 16, 2017.
CTFR, mailed on Feb. 23, 2018, re: Wesley Hales, U.S. Appl. No. 15/011,237, filed Jan. 29, 2016.
CTNF, mailed on Apr. 19, 2018, re: Michael J. Ficarra, U.S. Appl. No. 15/919,034, filed Mar. 12, 2018.
CTNF, mailed on May 3, 2018, re: Marc R. Hansen, U.S. Appl. No. 15/148,139, filed May 6, 2016.
NOA, mailed on Apr. 30, 2018, re: Xiaoming Zhou, U.S. Appl. No. 15/651,303, filed Jul. 17, 2017.
CTNF, mailed on May 15, 2018, re: Marc R. Hansen, U.S. Appl. No. 15/202,755, filed Jul. 6, 2016.
CTFR, mailed on May 10, 2018, re: Nwokedi Idika, U.S. Appl. No. 14/728,596, filed Jun. 2, 2015.
CTNF, mailed on Feb. 16, 2018, re: Siying Yang, U.S. Appl. No. 15/068,468, filed Mar. 11, 2016.
NOA, mailed on May 18, 2018, re: Siying Yang, U.S. Appl. No. 14/942,769, filed Nov. 16, 2015.
CTNF, mailed on May 23, 2018, re: Bei Zhang, U.S. Appl. No. 14/859,084, filed on Sep. 18, 2015.
CTFR, mailed on May 17, 2018, re: Jarrod S. Overson, U.S. Appl. No. 15/059,080, filed Mar. 2, 2016.
NOA, mailed on May 14, 2018, re: Xiaoming Zhou, U.S. Appl. No. 15/651,303, filed Jul. 17, 2017.
CTNF, mailed on Jun. 7, 2018, re: Siying Yang, U.S. Appl. No. 14/925,547, filed Oct. 28, 2015.
CTNF, mailed on Jun. 29, 2018, re: Timothy Dylan Peacock, U.S. Appl. No. 15/137,824, filed Apr. 25, 2016.
CTNF, mailed on Feb. 1, 2018, re: Nwokedi Idika, U.S. Appl. No. 15/204,710, filed Jul. 7, 2016.
NOA, mailed on Aug. 13, 2018, re: Daniel G. Moen, U.S. Appl. No. 14/980,231, filed Dec. 28, 2015.
CTNF, mailed on Jul. 31, 2018, re: Wesley Hales, U.S. Appl. No. 15/011,237, filed Jan. 29, 2016.
NOA, mailed on Sep. 5, 2018, re: Daniel G. Moen, U.S. Appl. No. 14/980,231, filed on Dec. 28, 2015.
NOA, mailed on Sep. 17, 2018, re: Siying Yang, U.S. Appl. No. 14/942,769, filed Nov. 16, 2015.
NOA, mailed on Sep. 5, 2018, re: Michael J. Ficarra, U.S. Appl. No. 15/919,034, filed Mar. 12, 2018.
NOA, mailed on Jul. 5, 2018, re: Siying Yang, U.S. Appl. No. 15/068,468, filed Mar. 11, 2016.
NOA, mailed on Sep. 19, 2018, re: Nwokedi Idika, U.S. Appl. No. 15/204,710, filed Jul. 7, 2016.
CTNF, mailed on Sep. 19, 2018, re: Eli Mattson, U.S. Appl. No. 15/430,224, filed Feb. 10, 2017.
NOA, mailed on Sep. 13, 2018, re: Justin D. Call, U.S. Appl. No. 15/785,309, filed Oct. 16, 2017.
NOA, mailed on Oct. 24, 2018, re: Marc R. Hansen, U.S. Appl. No. 15/148,139, filed May 6, 2016.
CTFR, mailed on Sep. 11, 2018, re: Michael J. Ficarra, U.S. Appl. No. 15/060,380, filed Mar. 3, 2016.
CTFR, mailed on Nov. 1, 2018, re: Marc. R. Hansen, U.S. Appl. No. 15/202,755, filed Jul. 6, 2016.
CTFR, mailed on Nov. 30, 2018, re: Siying Yang, U.S. Appl. No. 14/925,547, filed Oct. 28, 2015.
NOA, mailed on Nov. 27, 2018, re: Nwokedi Idika, U.S. Appl. No. 15/204,710, filed Jul. 7, 2016.
CTNF, mailed on Oct. 5, 2018, re: Zhiwei Li, U.S. Appl. No. 15/968,573, filed May 1, 2018.
NOA, mailed on Sep. 12, 2018, re: Justin D. Call, U.S. Appl. No. 15/645,787, filed Jul. 10, 2017.
CTNF, mailed on Nov. 29, 2018, re: Jarrod S. Overson, U.S. Appl. No. 15/059,080, filed Mar. 2, 2016.
NOA, mailed on Jan. 3, 2019, re: Bei Zhang, U.S. Appl. No. 14/859,084, filed Sep. 18, 2015.
CTNF, mailed on Jan. 24, 2019, re: Nwokedi Idika, U.S. Appl. No. 14/728,596, filed Jun. 2, 2015.
CTFR, mailed on Jan. 17, 2019, re: Wesley Hales, U.S. Appl. No. 15/011,237, filed Jan. 29, 2016.
NOA, mailed on Feb. 6, 2019, re: Eli Mattson, U.S. Appl. No. 15/430,224, filed Feb. 10, 2017.
NOA, mailed on Mar. 25, 2019, re: Siying Yang, U.S. Appl. No. 14/925,547, filed Oct. 28, 2015.
CTFR, mailed on Apr. 15, 2019, re: Jarrod S. Overson, U.S. Appl. No. 15/059,080, filed Mar. 2, 2016.
NOA, mailed on Mar. 11, 2019, re: Zhiwei Li, U.S. Appl. No. 15/968,573, filed May 1, 2018.

(56) References Cited

OTHER PUBLICATIONS

CTNF, mailed on May 15, 2019, re: Michael J. Ficarra, U.S. Appl. No. 15/060,380, filed Mar. 3, 2016.
NOA, mailed on Jun. 3, 2019, re: Siying Yang, U.S. Appl. No. 16/190,015, filed Nov. 13, 2018.
CTNF, mailed on May 16, 2019, re: Marc R. Hansen, U.S. Appl. No. 15/202,755, filed Jul. 6, 2016.
CTFR, mailed on Jul. 1, 2019, re: Nwokedi Idika, U.S. Appl. No. 14/728,596, filed Jun. 2, 2015.
NOA, mailed on Aug. 28, 2019, re: Justin Call, U.S. Appl. No. 15/925,748, filed Mar. 19, 2018.
CTNF, mailed on Sep. 4, 2019, re: Timothy Dylan Peacock, U.S. Appl. No. 15/137,824, filed Apr. 25, 2016.
CTNF, mailed on Aug. 14, 2019, re: Nwokedi Idika, U.S. Appl. No. 16/236,520, filed Dec. 30, 2018.
CTNF, mailed on Sep. 4, 2019, re: Justin D. Call, U.S. Appl. No. 16/234,848, filed Dec. 28, 2018.
CTNF, mailed on Sep. 4, 2019, re: Bei Zhang, U.S. Appl. No. 16/413,451, filed May 15, 2019.
CTNF, mailed on Sep. 4, 2019, re: Xiaoming Zhou, U.S. Appl. No. 15/945,944, filed Apr. 5, 2018.
CTNF, mailed on Oct. 2, 2019, re: Justin D. Call, U.S. Appl. No. 16/233,634, filed Dec. 27, 2018.
NOA, mailed on Oct. 3, 2019, re: Marc R. Hansen, U.S. Appl. No. 15/202,755, filed Jul. 6, 2016.
CTNF, mailed on Sep. 24, 2019, re: Ganesh Jampani, U.S. Appl. No. 16/259,890, filed Jan. 28, 2019.
NOA, mailed on Oct. 17, 2019, re: Michael J. Ficarra, U.S. Appl. No. 15/060,380, filed May 3, 2016.
NOA, mailed on Dec. 3, 2019, re: Nwokedi Idika, U.S. Appl. No. 16/236,520, filed Dec. 30, 2018.
CTNF, mailed on Dec. 11, 2019, re: Siying Yang, U.S. Appl. No. 16/236,519, filed Dec. 30, 2018.
CTNF, mailed on Dec. 13, 2019, re: Wesley Hayes, U.S. Appl. No. 15/011,237, filed Jan. 29, 2016.
NOA, mailed on Dec. 11, 2019, re: Jarrod S. Overson, U.S. Appl. No. 15/059,080, filed Mar. 2, 2016.
NOA, mailed on Dec. 18, 2019, re: Xiaoming Zhou, U.S. Appl. No. 15/945,944, filed Apr. 5, 2018.
U.S. Appl. No. 16/457,589, filed Oct. 24, 2019, Zhiwei Li.
EP App. No. 14730229.3, Intention to Grant, EP, Call et al., dated May 23, 2017.
Examination Report No. 1 Standard Patent Application, App. No. 2014237025, AU, Call, Justin D, dated Sep. 25, 2014.
Detection and Analysis of Drive-by-Download Attacks and Malicious JavaScript Code, Apr. 26, 2010.
Defending Browsers against Drive-by Downloads: Mitigating Heap-spraying Code Injection Attacks, Jul. 9, 2009.
Intrusion Detection using Sequences of System calls, Aug. 18, 1998.
Detecting and Preventing Drive-By Download Attack via Participative Monitoring of the Web, Jul. 23, 2013.
Recent Java exploitation trends and malware, Jul. 26, 2012.
DoDOM: Leveraging DOM Invariants for Web 2.0 Application Robustness Testing, Nov. 1, 2010.
Cujo: Efficient Detection and Prevention of Drive-by-Download Attacks, Dec. 6, 2010.
Design and Implementation of a Distributed Virtual Machine for Networked Computers, 1999.
International Search Report, dated Jan. 21, 2015, PCT/US14/23635.
International Search Report, dated Sep. 22, 2016, PCT/US16/40645.
International Search Report, dated Feb. 16, 2017, PCT/US16/53472.
International Search Report, dated Oct. 11, 2016, PCT/US16/41337.
International Search Report, dated Jul. 1, 2016, PCT/US16/25092.
International Search Report, dated Aug. 14, 2014, PCT/US14/27805.
International Search Report, dated Aug. 1, 2014, PCT/US14/24232.
International Search Report, dated Jul. 18, 2014, PCT/US14/23897.
International Search Report, dated Jun. 3, 2013, PCT/US13/26516.
DuPaul, Neil, "Common Malware Types: Cybersecurity 101", Veracode, Oct. 12, 2012, 9 pages, Oct. 12, 2012.
Friendly Bit, "Rendering a web page—step by step", published Jan. 11, 2010, pp. 1-2, Jan. 11, 2010.
"Custom Elements: defining new elements in HTML", Dec. 8, 2013, 15 pages, Dec. 8, 2013.

\* cited by examiner

SECURITY SYSTEMS FOR MITIGATING ATTACKS FROM A HEADLESS BROWSER EXECUTING ON A CLIENT COMPUTER

BENEFIT CLAIM

This application claims the benefit under 35 U.S.C. § 120 as a Continuation of U.S. application Ser. No. 15/968,573, filed May 1, 2018, which is a Continuation of U.S. application Ser. No. 14/718,736, now U.S. Pat. No. 9,986,058, filed May 21, 2015, the entire contents of which is hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF THE DISCLOSURE

The present disclosure generally relates to security techniques applicable to client/server systems, and relates more specifically to techniques for improving resistance of server computers to attacks by client computers.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Browsers are powerful computer program applications that may request and execute instructions received from a web server to generate complex user interfaces that are presented to a user through one or more devices, such as a monitor or speakers. In response to input from a user, such as a mouse click indicating that the user selected an object defined in the instructions, such as a link, a browser may send a request based on the selected object to the web server. The request may be a request for data and/or include data to be processed by the web server.

Attackers may use software, often referred to as a "bot" or "headless browser", which imitates a browser used by a legitimate user by receiving instructions from a web server and generating requests based on those instructions. For example, a bot may receive a web page, gather data in one or more objects defined in the web page, and generate a request for another web page to gather additional data, as if a user using a browser was requesting a new web page. Also for example, a bot may generate and send a request with data assigned to one or more parameters to simulate a user submitting data to a web server through a browser.

Attackers may use bots to commit many types of unauthorized acts, crimes or computer fraud, such as content scraping, ratings manipulation, fake account creation, reserving rival goods attacks, ballot stuffing attacks, password snooping, web site scraping attacks, vulnerability assessments, brute force attacks, click fraud, DDoS attacks, bidding wars, and stack fingerprinting attacks. As a specific example, a malicious user may cause a bot to traverse through pages of a web site and collect private and/or proprietary data, such as who is connected with whom on a particular social networking web site.

Web server administrators may wish to prevent malicious users from attacking the site, while allowing legitimate users to use the site as intended. However, it is difficult to determine whether a legitimate user is using a web browser or whether the browser is infected, and/or operated, by a malicious user.

SUMMARY

The appended claims may serve as a summary of the invention.

Figure 1:
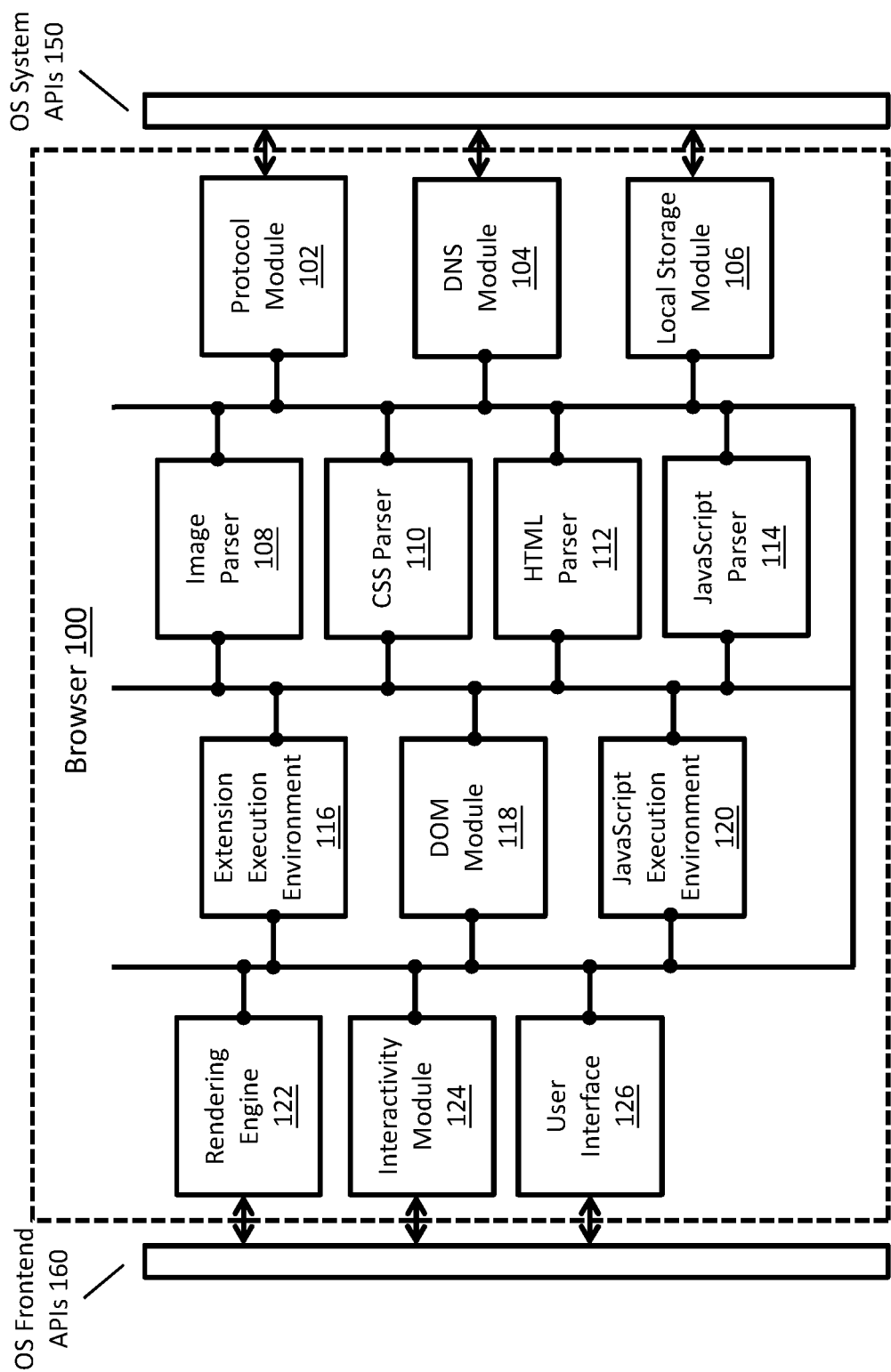
FIG. 1 illustrates functional units of a web browser.

While each of the drawing figures illustrates a particular embodiment for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments. For example, intermediary computer 230 in FIG. 2 may be described with reference to several components illustrated in FIG. 3 and discussed in detail below, but using the particular arrangement illustrated in FIG. 3 is not required in other embodiments. Furthermore, while the instructions discussed in many example embodiments are HyperText Markup Language ("HTML") and JavaScript instructions, in other embodiments, the instructions intercepted and generated may be any other standard and/or proprietary instructions configured to be executed by a client computer. HTML may include one or more implementations, such as eXtensible HyperText Markup Language ("XHTML").

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
  2.0 Browsers, Bots, and Attacks
    2.1 Example Browser Anatomy
    2.2 Example Bot or "Headless Browser" Anatomy
  3.0 Distinguishing between Browsers Operated by Legitimate Users and Bots
    3.1 Browser Detection with Telemetry Data
      3.1.1 Sections
      3.1.2 Sessions 3.1.3 Checkpoints
   3.1.3.1 Checkpoint Records
   3.1.3.2 Checkpoint Tokens
      3.1.3.2.1 Ordered Checkpoint Tokens
      3.1.3.2.2 Scoped Checkpoint Tokens
      3.1.3.2.3 State-Dependent Checkpoint Tokens
      3.1.3.2.4 Randomized Checkpoint Tokens
      3.1.3.2.5 Multi-Component Checkpoint Tokens
      3.1.3.2.6 Obfuscating Checkpoint Tokens
   3.1.3.3 Mandatory Checkpoints
   3.1.3.4 Optional Checkpoints
   3.1.3.5 Negative Checkpoints
4.0 Example Network Topology that Detects whether a Browser is a Legitimate Browser or a Bot
   4.1 Web Infrastructure
   4.2 Intermediary Computer
      4.2.1 Protocol Client Logic
      4.2.2 Processing Logic
      4.2.3 Injection logic
      4.2.4 Protocol Server Logic
      4.2.5 Bot Check logic
      4.2.6 Reverse logic
      4.2.7 Configurations
      4.2.8 Storage
   4.3 Browser
5.0 Process Overview
   5.1 Intercepting Instructions from a Content Server Computer
   5.2 Injecting Browser-Detection tests
   5.3 Determining whether a Browser is a Legitimate Browser and/or a Bot
      5.3.1 Validating a Checkpoint Token
      5.3.2 Determining a Likelihood that a Browser is a Legitimate Browser or a Bot
      5.3.3 Updating the Status of a Checkpoint
   5.4 Responding to a Browser that is Determined to be a Bot
   5.5 Responding to a Browser that is Determined to be a Legitimate Browser
6.0 Implementation Mechanisms—Hardware Overview
7.0 Other Aspects of Disclosure
1.0 General Overview In an embodiment, a computer system comprises a memory; one or more processors coupled to the memory; a processor logic coupled to the memory and the one or more processors, and programmed to: intercept, from a server computer, one or more original instructions to be sent to a browser of a client computer; send the one or more original instructions to the browser and one or more telemetry instructions, wherein the telemetry instructions are configured to, if executed, generate a set of telemetry data indicating the browser interacted with one or more objects and to send the set of telemetry data to the intermediary computer; receive the set of telemetry data and determine whether the browser is legitimate or illegitimate based on the set of telemetry data.

In an embodiment, a computer system is configured to improve security of server computers interacting with client computers through an intermediary computer, and comprising: one or more processors; a processor logic coupled to the one or more processors and programmed to: intercept, from a server computer, a web page comprising HTML, CSS and JavaScript instructions to be sent to a browser of a client computer; inject, into the web page, one or more browser-detection JavaScript instructions, which if executed, cause one or more operations to be performed on the client computer and send a set of telemetry data to the computer system; send the web page with the one or more browser-detection JavaScript instructions to the browser on the client computer; receive the set of telemetry data and determine whether the browser is legitimate or illegitimate based, at least in part, on the set of telemetry data.

In an embodiment, a data processing method for improving security of a server computer interacting with a client computer through an intermediary computer comprising: receiving, through a browser on the client computer, a set of instructions with one or more browser-detection instructions; executing the one or more browser-detection instructions, and in response, generating a set of telemetry data indicating the browser interacted with one or more objects in a particular order; sending the set of telemetry data to the intermediary computer.

Embodiments discussed herein provide numerous benefits and improvements over the general idea of increasing the resistance of servers to computer attacks. For example, one or more of the embodiments discussed herein may filter out requests from bots and/or browsers operated by malicious users. One or more of the embodiments discussed herein may allow a server computer to determine whether additional countermeasures should be sent to a browser to prevent automated attacks.

2.0 Browsers, Bots, and Attacks

A web browser may be a tool through which server-based application programs can provide client computers with content in a dynamic, custom UI. For example, in response to receiving a request for data from a web browser, a web server may respond with a set of instructions that define one or more objects with one or more object identifiers. The instructions may use the object identifiers to define how objects may be presented in a UI to enable human/computer interaction. For convenience of expression, a set of instructions may be referred to herein as a file and/or web page. A set of instructions, file, and/or web page need not have a particular type or extension, and need not be stored in persistent storage. For example, a web page may be generated dynamically based on one or more parameters. While some files may be identified as a particular type of file, such as an "HTML file" or "JavaScript file", a file may include mixed content. For example, an HTML file may include HTML, JavaScript, Cascading Style Sheets ("CSS"), and/or any other standard and/or proprietary set of instructions. Furthermore, a file need not be a file stored in persistent storage.

In contrast, bots traverse web pages and/or web sites to retrieve data from, and/or submit data to, one or more web servers with little, if any, human/computer interaction. For example, in response to receiving a request for data from a bot, a web server may respond with a set of instructions. A bot may parse the instructions to collect data from, and/or to store data in, particular objects with particular object identifiers. A bot may also make requests based on an object identifier, such as the identifier for a text field input. However, unlike a browser, a bot need not execute the instructions that define how objects should be presented in a UI because the bot is built to operate with little, if any, human/computer interaction. Thus, a bot may be a functionally-limited browser.

2.1 Example Browser Anatomy

FIG. 1 illustrates functional units of a web browser. Browser 100 may be a browser that is executed on a personal computer, used to communicate with or otherwise conceptually visit a web server, and operated by a user using the personal computer. Browser 100 is communicatively coupled with operating system ("OS") system application programming interface ("API") layer 150 and OS frontend API layer 160. Other embodiments may use other protocols, modules, and/or parsers.

Browser 100 comprises protocol module 102, domain name server ("DNS") module 104, local storage module 106, image parser 108, CSS parser 110, HTML parser 112, JavaScript parser 114, extension execution environment 116, document object model ("DOM") module 118, and JavaScript execution environment 120. Protocol module 102, DNS module 104, and local storage module 106 may send and/or receive data through OS System API layer 150. For example, protocol module 102 may send and/or receive data over any protocol, such as HTTP, to/from a server computer through OS system API layer 150. Data received through protocol module 102 may reference data sources by one or more domain names. DNS module 104 may resolve the one or more domain names referenced by interfacing with one or more remote domain name servers through OS system API layer 150. Local storage module may store and/or recall data from memory through OS system API layer 150.

Image parser 108, CSS Parser 110, HTML parser 112, and JavaScript parser 114 may parse data received through protocol module 102. HTML parser 112 may parse HTML data. CSS parser 110 may parse CSS data. JavaScript parser 114 may parse JavaScript data. Image parser 108 may parse image data. Each parser may generate and/or update objects in a DOM maintained by DOM module 118.

Browser 100 may comprise sets of program logic implementing one or more programmable engines, such as extension execution environment 116 and JavaScript execution environment 120. Extensions may be written one or more programming languages include JavaScript, Python, Ruby, and/or any other language. Each programmable engine may have access to DOM module 118 and may operate on one or more objects from a DOM maintained by DOM module 118. For example, JavaScript execution environment 120 may execute JavaScript parsed by JavaScript parser 114 and in response, create, update, and/or delete one or more objects managed by DOM module 118, and/or one or more aspects of a UI presenting the one or more objects.

Browser 100 comprises rendering engine 122, interactivity module 124, and user interface 126. Each of the components may cause, through OS frontend API layer 160, one or more objects to be presented to a user using a client computer. Rendering engine 122 may determine how objects are presented to a user. For example, rendering engine 122 may determine the color, shape, orientation, position, and/or any other visual and/or audio attribute of an image, text field, button, and/or any other object defined by a set of received instructions. Furthermore, rendering engine 122 may cause a button to be displayed on a monitor coupled to a client computer through OS frontend API layer 160.

User interface 126 may determine what may be presented to a user. For example, user interface 126 may determine that a "submit" button should be hidden until data has been entered in one or more text fields. After data has been entered in the one or more text fields, user interface 126 may notify rendering engine 122 to render the "submit" button accordingly.

Interactivity module 124 may receive one or more inputs through OS Frontend API layer 160. For example, in response to a user pressing a button on a mouse coupled to a client computer 299, the OS running on the client computer may send a message to interactivity module 124, through OS frontend API layer 160, to indicate that a user pressed a button on a mouse. Interactivity module 124 may determine that a user selected a particular button currently presented on a monitor. Interactively module 124 may notify user interface 126 and/or rendering engine 122 to update to update the UI accordingly. For convenience of expression, a browser performing an action, such as calling a function or making a request, may mean one or more components in the browser performing a the action.

2.2 Example Bot or "Headless Browser" Anatomy

A bot or "headless browser" may be a type of browser that includes a subset of the modules and/or features included in a browser used by a legitimate user, such as browser 100. For example, a bot may include protocol module 102, DNS module 104, local storage module 106, and HTML parser 112. A bot need not support a UI; thus, a bot need not include rendering engine 122, interactivity module 124, and user interface 126.

Less sophisticated bots need not include one or more parsers and/or execution environments. For example, a bot may be configured to look for data embedded in a DOM defined in one or more HTML documents. Therefore, the bot may include an HTML parser. However, the bot need not include one or more parsers or execution environments, such as image parser 108, CSS parser 110, JavaScript parser 114, extension execution environment 116, and/or JavaScript execution environment 120.

More sophisticated bots may include one or more parsers and/or execution environments. For example, a more sophisticated bot may include a JavaScript engine, such as JavaScript Execution Environment 120, which can be used to generate a run-time environment that executes JavaScript received from a web server.

3.0 Distinguishing Between Browsers Operated by Legitimate Users and Bots

As discussed herein, a bot may be used for various attacks against a server computer. If a web server can determine whether a client computer is executing a bot or a browser used a legitimate user, then the web server can stop responding to the requests sent by the bot and continue to respond to requests from browser being used by a legitimate user. Additionally or alternatively, a web server can attack the bot or the client computer(s) executing the bot. However, determining whether a client software application, running on a client computer, is a bot or a browser operated by a legitimate user can be difficult. For convenience of expression, a browser operated by a legitimate user may be a type of browser referred to herein as a legitimate browser. Browsers that are not legitimate browsers, such as bots, headless browsers, or compromised browsers, may be referred to herein as an illegitimate browser.

Some protocols, such as HTTP, allow for browsers and bots to expressly identify themselves to the server. For example, a browser used by a legitimate user may include a header with an attribute called "user-agent" in a request for data sent to a server computer. The value associated the "user-agent" attribute may identify the type of browser or bot sending the request. Ideally, a web server can determine whether the value associated with the user-agent attribute is a legitimate browser or a bot, and respond accordingly. For example, a web server may respond to a request from a legitimate browser with the data requested, and ignore a request from a bot. However, a malicious bot may spoof its identity by using the same value for the "user-agent" attribute as a legitimate browser.

3.1 Browser Detection with Telemetry Data

Although browsers and bots may include one or more of the same functional units discussed herein, each browser and/or bot may implement the functional units differently.

Furthermore, a browser that has been compromised by malware or other malicious software may cause a legitimate browser to implement the functionality of the units differently. For convenience of expression, a browser that is compromised may also be referred to as a bot or an illegitimate browser.

A server computer may perform one or more browser-detection tests or methods to determine whether a browser is a legitimate browser or a bot. A browser-detection test may be used determine whether or not a client computer is executing a browser, and/or which type of browser is requesting and/or receiving the data. For example, a browser-detection test may comprise one or more instructions that are sent to a client computer, which if executed, return results that indicate which type of browser, if any, the client computer is executing. Failure to return one or more expected results may indicate that the client computer is not executing a browser, the browser is an unsupported type of browser, and/or the client computer is executing a bot. Instructions sent to a client computer to detect which type of browser, if any, is being executed on a client computer may be referred to herein as browser-detection instructions. A browser-detection test may be performed in response to data generated from the client computer. For example, a browser-detection test may comprise a server computer sending browser-detection instructions to be sent to a client computer, and logic on the server computer configured to determine whether the results, if any, indicate that the client computer is executing a particular type of browser, if any.

There are many ways a server computer may detect or determine whether a browser is a particular type of browser, such as a legitimate browser or a bot. For example, a server computer may inject telemetry instructions into a web page that define, and/or cause, a client browser and/or computer to perform one or more operations that generate telemetry data and send the telemetry data to the server computer and/or other server computer, such as a remote, online storage system. The server computer may determine whether a browser is a legitimate browser or a bot based on the telemetry data. Accordingly, a telemetry instruction may be a type of browser-detection instruction. Other examples of browser-detection tests and/or methods are discussed herein.

Telemetry data is data collected from a client computer that describes usages, states, behaviors, measurements, and/or other metrics, statistics, or values that may indicate what a client computer is, and/or is not, doing. A server computer may use the telemetry data to classify the client computer and/or browser running on the client computer. Additionally or alternatively, a server computer may use the telemetry data or determine whether the client computer is behaving as expected. For example, and as discussed in detail herein, telemetry data generated by a browser on a client computer, and sent to a server computer, may indicate which execution path(s) the browser took while executing instructions received from the server computer, or how much time has passed after a web page is loaded and an object is selected. The server computer may use the telemetry data to classify the browser as a legitimate browser or a bot. Additionally or alternatively, the server computer may use the telemetry data to determine the likelihood that the browser is a legitimate browser or a bot.

In response to determining that a browser is a bot, the server computer may perform one or more additional browser detection methods and/or implement countermeasures in subsequent web pages. For example, in response to determining that the browser is a bot, the server computer may send one or more instructions to the bot that include disinformation and/or one or more decoy links that reference one or more web pages with disinformation. Additionally or alternatively, in response to a server computer failing to determine that the browser is a legitimate browser, the server computer may send additional, different telemetry instructions to the browser. Additionally or alternatively, in response to determining that a browser is a legitimate browser, the server computer may stop sending telemetry instructions and/or countermeasures to the browser.

3.1.1 Sections

A section may be a web page, and/or a portion of a web page, that includes one or more checkpoints (discussed in detail herein) and is associated with a section identifier. For example, a section may comprise HTML and/or JavaScript code that defines an object, which when interacted with by a browser, causes the browser to reach a checkpoint and execute one or more operations defined by one or more telemetry instructions. The section identifier may be encrypted and/or change over time.

A single section and/or web page may include one or more other sections. And, a single section may be embedded in one or more other sections, and/or in one or more of web pages. However, a particular section may be associated with the same particular section identifier regardless of which other section(s) and/or web page(s) the particular section is embedded in.

3.1.2 Sessions

A session may include one or more related requests sent from a browser. For example, a browser may make one or more requests originating from the same IP address, for a particular section. In response, a server computer may generate a new session identifier and respond to the requests with one or more sections, which include telemetry instructions that define one or more checkpoints.

The server computer may associate each section and/or checkpoint with a session. For example, the server computer may associate each section identifier that corresponds to a section sent to a browser during a particular session with a session identifier that corresponds to the particular session. The server may associate valid checkpoint tokens, which are discussed in detail herein, with the section(s) that are associated with the particular session. In many examples discussed herein a checkpoint token is associated with, and/or based on, a section identifier. Additionally or alternatively, a checkpoint token may be associated with, and/or based on a session identifier. For example, a checkpoint token may be based on a concatenation of a session identifier and a session identifier. Accordingly, and as discussed herein, a server computer may determine whether a checkpoint in a particular section and/or session was reached.

3.1.3 Checkpoints

A checkpoint may be one or more operations that are performed in response to a browser interacting with one or more objects, such as an input field, data structure, and/or function. The one or more operations may cause the browser to generate telemetry data indicating that the browser interacted with the one or more objects. A browser may interact with an object by presenting, selecting, referencing, calling, and/or performing one or more operations associated with the object. A checkpoint may be associated with a checkpoint identifier. The checkpoint identifier may be encrypted and/or change over time.

Checkpoints may be defined by telemetry instructions, which if executed by a browser, cause the browser to generate telemetry data. Checkpoints can be created and/or defined in many ways. For example, a checkpoint may be defined by one or more telemetry instructions that define a particular function that should be called and/or executed by the browser if and/or when the browser interacts with a particular object. In response to the browser interacting with the particular object, the browser may execute the particular function and generate telemetry data indicating the browser interacted with the object. Additionally or alternatively, a checkpoint may be defined by one or more telemetry instructions inserted into a block of code, such as a function. If the block of code is executed, then the one or more telemetry instructions may also be executed by the browser, causing the browser to generate telemetry data indicating the browser executed the particular block of code.

3.1.3.1 Checkpoint Records

At a checkpoint, a browser may generate telemetry data indicating that a particular checkpoint was reached. For example, when a checkpoint is reached, one or more telemetry instructions may cause the browser to generate a set of telemetry data that includes a checkpoint identifier and/or a checkpoint token, discussed in detail herein. The set of telemetry data generated in response to reaching a checkpoint may be referred to herein as a checkpoint record. A checkpoint record may, but need not be, a contiguous block in memory.

At a checkpoint, a browser may generate checkpoint record with telemetry data indicating the state of the browser and/or one or more objects. For purposes of illustrating a clear example, assume a checkpoint is created by inserting one or more telemetry instructions into a particular function definition, and the browser executing the particular function. The one or more telemetry instructions may cause the browser to perform a stack trace on a call stack to determine which function(s) directly and/or indirectly called the particular function. The browser may generate a checkpoint record with telemetry data that identifies each function that directly and/or indirectly caused the browser to reach the checkpoint. Additionally or alternatively, one or more telemetry instructions may cause the browser to generate a checkpoint record with telemetry data that indicates the value(s) stored in one or more objects when a checkpoint is reached.

A particular checkpoint may be reached multiple times. Each time a browser reaches the same checkpoint the browser may generate a new checkpoint record. However, a browser may generate a first checkpoint record the first time the browser reaches a particular checkpoint, and the browser may generate a second, different checkpoint record the second time the browser reaches the particular checkpoint.

3.1.3.2 Checkpoint Tokens

A checkpoint token may be a token that indicates a particular checkpoint was reached. For example, a first checkpoint may be associated with a unique checkpoint identifier. The unique checkpoint identifier may be the checkpoint token. Additionally or alternatively, a checkpoint token may include data that indicates one or more browser states and/or other telemetry data. For example, a check point token may indicate the order in which a browser reached one or more checkpoints, the data in one or more objects, and/or how a browser has interacted with one or more objects.

3.1.3.2.1 Ordered Checkpoint Tokens

A server computer may require one or more checkpoints to be executed in a particular order. A server computer may determine which checkpoints were reached and in which order using one or more techniques. For example, one or more telemetry instructions may be configured to cause a browser to store each checkpoint record in an ordered list in memory and send the ordered list to the server computer. The server computer may determine the order in which each checkpoint was reached based on the order of checkpoint records in the ordered list. In an embodiment, ordered checkpoints may represent a call stack and/or call chain that legitimate browsers are authorized to execute.

Additionally or alternatively, a checkpoint may cause a browser that reaches the checkpoint to generate a checkpoint token based on an initial token, identifier, and/or value, and/or a token generated by the browser at a previously reached checkpoint. The generated checkpoint token may indicate which checkpoints were reached and in which order. For purposes of illustrating a clear example, assume a set of telemetry instructions in a web page define a first token, X, which in this example may be a section identifier. Also assume the set of telemetry instructions in the web page define a first checkpoint associated with a first transformation, and a second checkpoint associated with a second transformation. The first transformation may generate a different result than the second transformation using the same one or more inputs. Accordingly, a browser may generate a second token, Y, by applying the first transformation to the first token, X. The browser may generate a third token, Z, by applying the second transformation to the second token, Y. However, the browser may generate a token that is different than Y or Z if the browser applies the first transformation to a token that is different than X. Furthermore, the browser may generate token that is different than Y or Z if the browser applies the second transformation to a token that is different than Y, such as the initial token X.

A server computer may determine which checkpoints were executed by a browser, and in which order, based on one or more checkpoint tokens stored in each checkpoint record. Continuing with the previous example, if a server computer receives a checkpoint record from a browser with the second token Y, then the server computer may determine that the browser reached the first checkpoint in the section before any other checkpoint. If the server computer receives a checkpoint record from a browser with the third token, Z, then the server computer may determine that the browser reached the second checkpoint in the section after reaching the first checkpoint. Additionally or alternatively, the server computer may determine that the browser did not reach any other checkpoints before reaching the first checkpoint and/or the second checkpoint. If the server computer does not receive a checkpoint record with the second token, Y, from a browser, then the server computer may determine that the browser reached the first checkpoint out of order, or the browser did not reach the first checkpoint. If the server computer does not receive a checkpoint record with the third token, Z, from a browser, then the server computer may determine that the browser reached the second checkpoint out of order, and/or the browser did not reach the second checkpoint.

3.1.3.2.2 Scoped Checkpoint Tokens

A server computer may determine which checkpoints a browser reaches in which section based on one or more checkpoint tokens stored in each checkpoint record. For purposes of illustrating a clear example, assume a first section is a first web page that includes a first token and/or first section identifier, H; a second section is a second web page that includes a second token and/or second section identifier, J; and the telemetry instructions in each section may define a checkpoint with a particular corresponding transformation. In response to reaching the checkpoint in the first section, a browser may generate a first checkpoint token, K, by applying the particular transformation to the first token, H. In response to reaching the checkpoint in the second web page, the browser may generate a second checkpoint token, L, by applying the particular transformation to the second token, J. Accordingly, if a server computer receives a checkpoint record with the first checkpoint token, K, from a browser, then the server computer may determine that the browser reached the checkpoint in the first section; otherwise, the server computer may determine that the browser did not reach the checkpoint in the first section. If the server computer receives a checkpoint record with the second checkpoint token, L, from a browser, then the server computer may determine that the browser reached the checkpoint in the second section; otherwise, the server computer may determine that the browser did not reach the first checkpoint on the second web page.

The first checkpoint token and the second checkpoint token are scoped checkpoint tokens because each checkpoint token is based on a scope, such as a section and/or session, in which the checkpoints were reached. In the example above, the two sections are different web pages or different portions of the same web page. However, the two sections may be the same web page sent to different browsers and/or in different sessions. Additionally or alternatively, the first checkpoint and the second checkpoint may be the same checkpoint but in different sections and/or sessions.

3.1.3.2.3 State-Dependent Checkpoint Tokens

A checkpoint token may be based on interactions between the browser and one or more objects and/or the state of the one or more objects. For purposes of illustrating a clear example, assume a web page includes a form with a submit button, and the web page includes one or more telemetry instructions that define a checkpoint that is reached just before the browser submits the data in the form to the server computer. In response to reaching the checkpoint, a browser may generate a checkpoint token that is based on the state of the submit button. For purposes of illustrating a clear example, assume that the checkpoint token is set to a first predefined token, P, if the browser indicates the state of the submitted button is selected, and the checkpoint token is set to a second predefined token, Q, if the browser indicates that the state of the submitted button is not selected.

A server computer may determine the state of a browser and/or section based on a checkpoint token. Continuing with the previous example, in response to receiving a checkpoint record with a checkpoint token that matches the first predefined token, P, the server computer may determine that the submit button was selected when the browser reached the corresponding checkpoint. In response to receiving a checkpoint record with a checkpoint token that matches the second predefined token, Q, the server computer may determine that the submit button was not selected when the browser reached the corresponding checkpoint. Accordingly, if the server computer receives a checkpoint token that matches the second predefined token, Q, then the server computer may determine that the browser is a bot, because a user expected to reach the checkpoint by pressing the particular submit button. Additionally or alternatively, if the server computer receives a checkpoint token that matches the first predefined token, P, then the server computer may determine that the browser is a legitimate browser.

A state-dependent checkpoint token may be based on one or more objects and/or one or more attributes related to one or more sections and/or objects. For example, a checkpoint may cause a browser to generate a state-dependent checkpoint token by concatenating each value in one or more hidden input fields. Additionally or alternatively, a state-dependent checkpoint token may be based on data associated with a particular section and/or session, such as a section identifier and/or a session identifier, the length of the data in a section, the length of time a section has been loaded and/or presented on a display, the length of the data in another section and/or a section in a previous web page, a hash code, and/or any other value that may be stored and/or derived from a section and/or session. In an embodiment, a state-dependent checkpoint token may include a stack trace indicating one or more functions that directly and/or indirectly cause the browser to reach the checkpoint that corresponds with the state-dependent checkpoint.

3.1.3.2.4 Randomized Checkpoint Tokens

A checkpoint token may be a value generated based on a random number generator. The more values that a random number generator is configured to generate, the less likely a web browser will generate the same randomized checkpoint token twice. Receiving the same randomized checkpoint token may indicate that a bot is sending previously generated telemetry data to the server computer and/or is trying to spoof telemetry data. Accordingly, if a server computer receives the same checkpoint token, for the same checkpoint and/or a different checkpoint, from the same browser, then the server computer may determine that the checkpoint token is invalid. In response, the server computer may determine that the browser is a bot.

3.1.3.2.5 Multi-Component Checkpoint Tokens

A multi-component checkpoint token may be a checkpoint token that comprises one or more of the various tokens discussed herein. For example, a multi-component checkpoint token may be a checkpoint token that includes an ordered checkpoint token, a scoped checkpoint token, a state-dependent checkpoint token, and a randomized checkpoint token. A multi-component checkpoint token may, but need not, be stored in a single contiguous block in memory. A multi-component checkpoint token may be valid if each of the checkpoint token components is valid. Additionally or alternatively, a multi-component checkpoint token may be invalid if one or more of the checkpoint token components are invalid.

3.1.3.2.6 Obfuscating Checkpoint Tokens

A checkpoint token and/or a checkpoint token component may be obfuscated using one or more of the values, identifiers, and/or checkpoint token components. For example, a checkpoint token may be offset within a checkpoint record by the same number of bits as the value of a randomized checkpoint token, randomized checkpoint token component, and/or a randomized checkpoint token component from a different checkpoint token. Additionally or alternatively, a checkpoint token component may be offset within a multi-component checkpoint token based on the same number of bits as the value of a randomized checkpoint token component.

3.1.3.3 Mandatory Checkpoints

A checkpoint may be designated as a mandatory checkpoint. A mandatory checkpoint may be a checkpoint that a server computer requires a browser to reach in order for the server computer to determine that the browser is a legitimate browser and/or is less likely to be a bot. In response to determining that a checkpoint token for a mandatory checkpoint is not included in a set of telemetry data, and/or the checkpoint token includes one or more invalid components, received from a browser on a client computer, the server computer may determine that the browser is, and/or is more likely to be, a bot.

3.1.3.4 Optional Checkpoints

A checkpoint may be designated as an optional checkpoint. An optional checkpoint may be a checkpoint that a server computer does not require a browser to reach in order for the server computer to determine the browser is a legitimate browser. However, if the checkpoint is reached, the server computer may validate the corresponding checkpoint token to determine whether the browser is, and/or is more likely to be, a legitimate browser or a bot. For purposes of illustrating a clear example, assume a browser sends telemetry data to a server computer with a checkpoint token that corresponds with an optional checkpoint, and the checkpoint token is a multi-component checkpoint token. In response to determining that the checkpoint token corresponds to an optional checkpoint, and that one or more of the components in the checkpoint token are invalid, the server computer may determine that the browser is, and/or is more likely to be, a bot.

3.1.3.5 Negative Checkpoints

A checkpoint may be designated as a negative checkpoint. A negative checkpoint may be a checkpoint a server computer requires a browser to not reach in order for the server computer to determine that the browser is, and/or is more likely to be, a legitimate browser. For example, a web page may define a button that is not visually displayed to a user using a legitimate browser. A checkpoint may be defined as a callback function that is executed if the browser interacts with the hidden button. A legitimate browser need not interact with the hidden button because a legitimate browser need not show the hidden button a legitimate user for the user to select. However, an autonomous bot without a display may interact with the button as part of an attack regardless of whether or not the button is hidden, which causes the bot to reach the negative checkpoint (the callback function). The negative checkpoint may be configured to cause the browser to generate telemetry data that includes a checkpoint token that corresponds with, and/or identifies, the negative checkpoint, which indicates that the browser reached the negative checkpoint. The negative checkpoint may be configured to cause the browser to send the telemetry data to a server computer. In response to receiving the telemetry data and determining the negative checkpoint was reached, the server computer may determine that the browser is, and/or is more likely to be, a bot.

Figure 2:
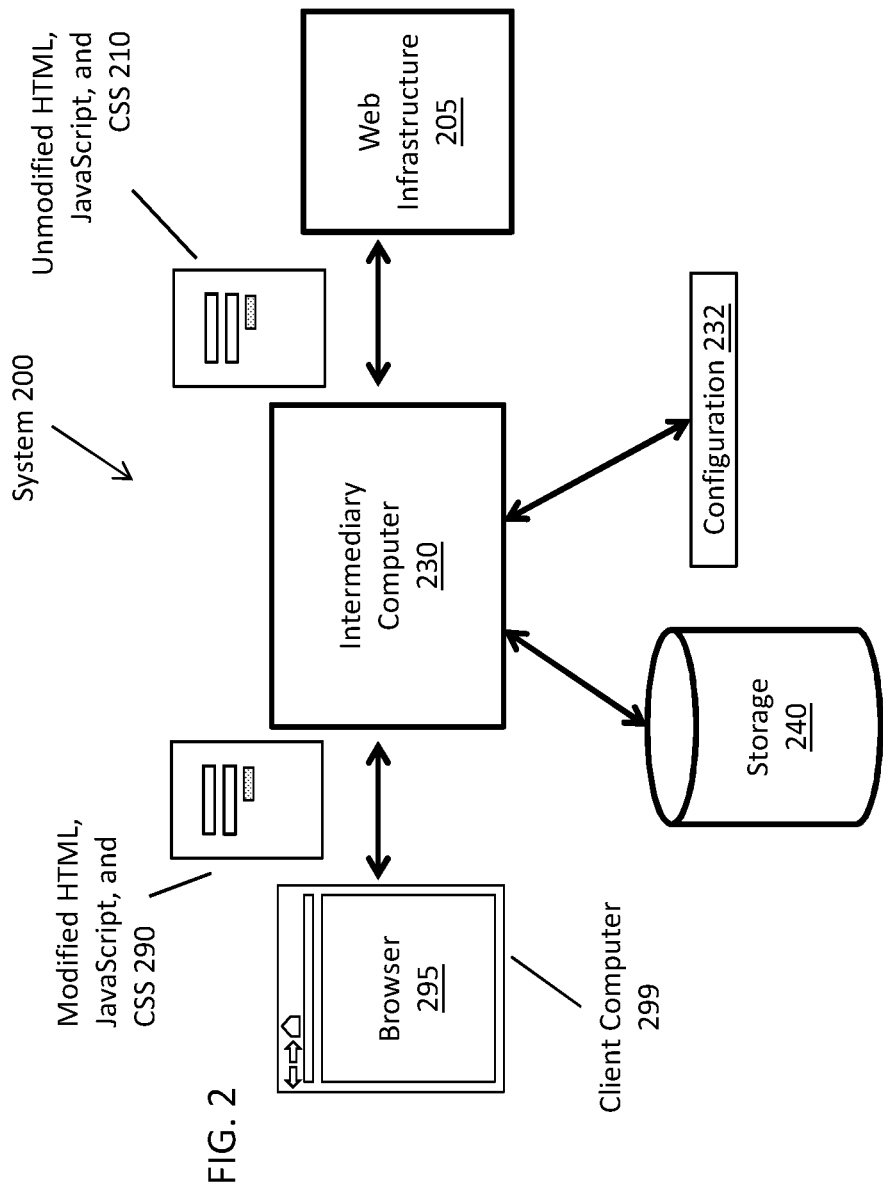
FIG. 2 illustrates a computer system comprising a browser, an intermediary computer, and a web infrastructure in an example embodiment.
Figure 3:
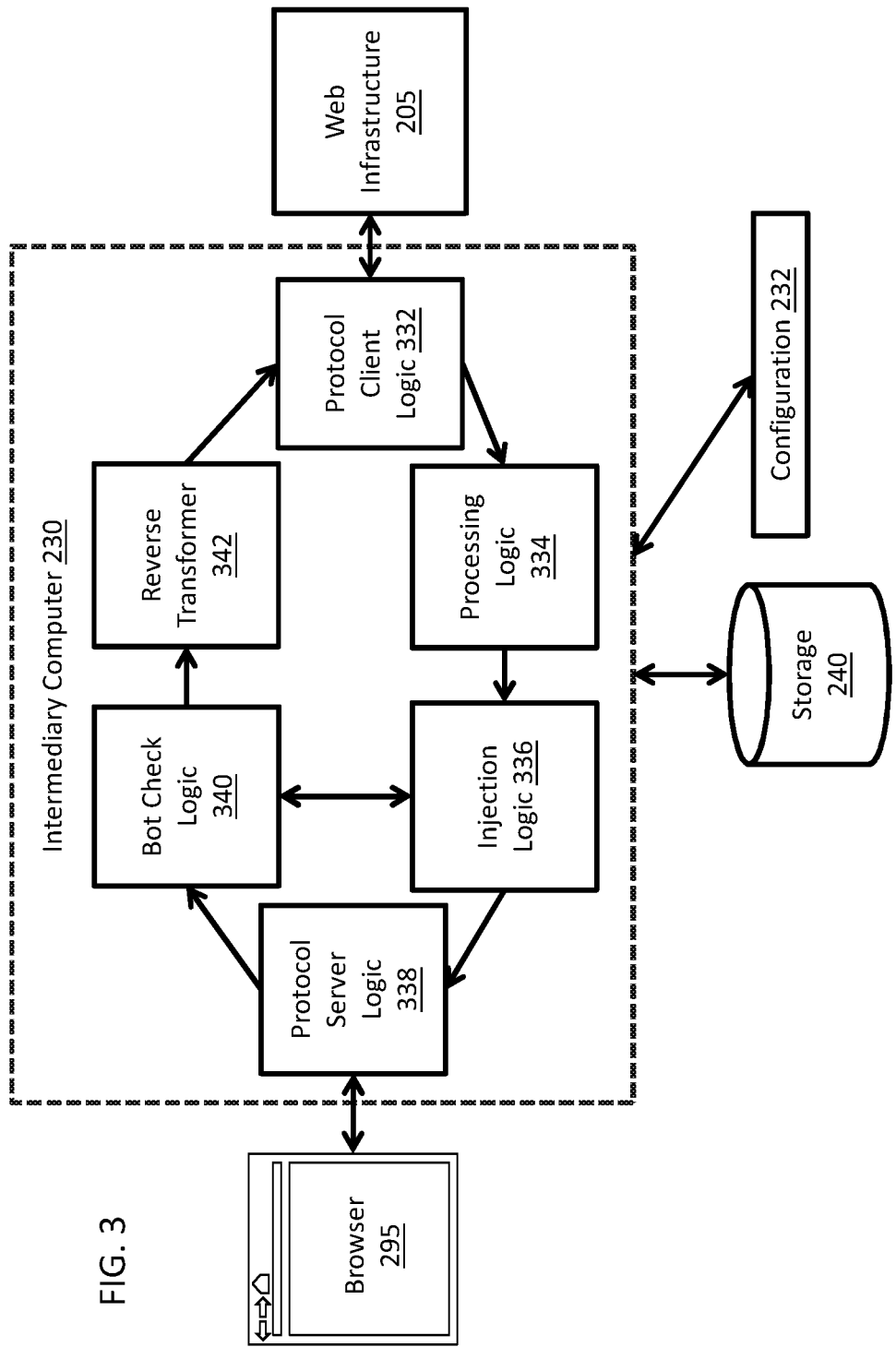
FIG. 3 illustrates detailed view of an intermediary computer in an example embodiment.

4.0 Example Network Topology that Detects Whether a Browser is a Legitimate Browser or a Bot FIG. 2 illustrates a computer system comprising a browser, an intermediary computer, and a web infrastructure in an example embodiment. Referring first to FIG. 2, system 200 includes web infrastructure 205, client computer 299, intermediary computer 230, storage 240, and configuration 232 distributed across a plurality of interconnected networks.

A "computer" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. Any reference to "a computer" herein may mean one or more computers, unless expressly stated otherwise.

While each of the components listed above is illustrated as if running on a separate, remote computer from each other, one or more of the components listed above may be part of and/or executed on the same computer. For example, intermediary computer 230, configuration 232, storage 240, and/or web infrastructure 205 may be executed on the same computer, local area, and/or wide area network. Additionally or alternatively, intermediary computer 230 may be a proxy server and/or layer for web infrastructure 205. Additionally or alternatively, intermediary computer 230 may be in line between a router and web infrastructure 205, such that intermediary computer 230 may intercept all network data sent to, and/or sent from, web infrastructure 205 over one or more protocols. Additionally or alternatively, intermediary computer 230, and/or one or more modules comprising intermediary computer 230 discussed herein, may be a software layer between, and/or executed on, web infrastructure 205 and/or a component of web infrastructure 205. Additionally or alternatively, intermediary computer 230, and/or one or more modules comprising intermediary computer 230 discussed herein, may be part of a server-side application that responds to requests over one or more standard and/or proprietary protocols, such as HTTP and/or any other protocol.

4.1 Web Infrastructure

Web infrastructure 205 may comprise one or more server computers that receive requests for data from users through one or more computers, such as client computer 299 and/or intermediary computer 230. Web infrastructure 205 may respond by sending data to the browser that sent the request. As illustrated in FIG. 2, the data sent from web infrastructure 205 may include instructions: HTML, JavaScript, and CSS 210. The one or more computers in web infrastructure 205 may, but need not, be owned and/or managed by one or more independent entities and may span across one or more computer networks.

A server computer may be a computer that receives requests for data and responds with data. For example, a web server computer may be an HTTP-based computer that receives HTTP requests and responds with data comprising HTML, CSS, and/or JavaScript instructions. Additionally or alternatively, a server computer may respond with data that references data on other server computers in, and/or outside of, web infrastructure 205.

4.2 Intermediary Computer

Intermediary computer 230 may be an intermediary that may intercept instructions sent from web infrastructure 205, parse and/or execute one or more of the intercepted instructions, modify the intercepted instructions, generate and/or add new instructions, and send the modified and/or new instructions to a client computer. For example, intermediary computer 230 may intercept HTML, JavaScript, and CSS 210, generate modified HTML, JavaScript, and CSS 290, and send modified HTML, JavaScript, and CSS 290 to browser 295. Intermediary computer 230 may intercept a request from browser 295, generate a new and/or modified request, and send the new and/or modified request to web infrastructure 205.

Intermediary computer 230 may be an HTTP or SPDY intermediary that intercepts, parses, executes, and/or processes HTML, JavaScript, and CSS instructions. Additionally or alternatively, intermediary computer 230 may intercept requests for data and/or instructions from a client application, generate a new HTTP request, and send the newly generated HTTP request to one or more HTTP and/or SPDY-based web servers. Additionally or alternatively, intermediary computer 230 may be an intermediary for any other standard and/or proprietary protocol. Additionally or alternatively, intermediary computer 230 may intercept and/or generate instructions in one or more other standard and/or proprietary languages, such as VBScript and/or DART. Additionally or alternatively, intermediary computer 230 may intercept and/or generate instruction in one or more Turing-complete browser supported programming language capable of interfacing with, and/or generating, a document object model and/or a browser loaded HTML/XHTML document. Furthermore, each of the components discussed herein, which intermediary computer 230 is comprised of, may be configured to perform any of the processes and/or methods discussed herein for any standard and/or proprietary protocol.

Intermediary computer 230 may be a server computer that one or more domain name servers or other elements of the domain name system ("DNS") identify in DNS records as a destination network address associated with one or more internet domain names. Accordingly, intermediary computer 230 and/or intermediary computer 230 may receive requests sent to the one or more domains from a browser or bot. Based on using DNS to resolve the domain name in a request to a network address, intermediary computer 230 may forward the request, or a modified request, to a server computer in web infrastructure 205, such as original web server computer 302.

In FIG. 2, intermediary computer 230 is programmed to send instructions to, and receive requests from, a particular type of client application: browser 295. However, in an embodiment, intermediary computer 230 may be programmed to send instructions to, receive requests from, and/or open sockets with browsers and/or bots.

FIG. 3 illustrates detailed view of an intermediary computer in an example embodiment. In FIG. 3, intermediary computer 230 comprises protocol client logic 332, processing logic 334, injection logic 336, protocol server logic 338, bot check logic 340, and reverse logic 342. In an embodiment, each of the functional units of intermediary computer 230 may be implemented using any of the techniques further described herein in connection with FIG. 5; for example, the intermediary computer 230 may comprise a general-purpose computer configured with one or more stored programs which when executed cause performing the functions described herein for the intermediary computer, or a special-purpose computer with digital logic that is configured to execute the functions, or digital logic that is used in other computing devices. While the figures include lines that indicate various devices and/or modules being communicatively coupled, each of the computers, devices, modules, storage, and configurations may be communicatively coupled with each other.

4.2.1 Protocol Client Logic

Protocol client logic 332 may intercept data over any standard or proprietary protocol. For example, protocol client logic 332 may intercept data over HTTP.

4.2.2 Processing Logic

Processing logic 334 may process instructions intercepted by protocol client logic 332, which may cause processing logic 334 to process, parse, and/or executed instructions and/or content received by protocol client logic 332. Accordingly, processing logic 334 may generate one or more data structures in memory. Processing one or more instructions may comprise parsing and/or executing the one or more instructions. After processing the instructions, processing logic 334 may notify injection logic 336 to begin rendering instructions based on the one or more data structures created by processing logic 334 that are currently in memory.

Processing logic 334 may make requests for additional data. For example, if instructions received from protocol client logic 332 reference additional instructions stored on another web server, then processing logic 334 may request the additional instructions through protocol client logic 332.

4.2.3 Injection Logic

Injection logic 336 define one or more sections in a web page and/or a session based on configuration 232, data structures in memory, and/or any other data, inputs, and/or factors. Injection logic 336 may inject, into a section, one or more telemetry instructions that define the one or more checkpoints, which if reached, may cause a browser to perform one or more operations and send the resulting telemetry data back to intermediary computer 230. Injection logic 336 may send one or section with one or more telemetry instructions to one or more client computers through protocol server logic 338.

Injecting instructions into a web page may mean inserting and/or appending instructions into the web page and/or file. Additionally or alternatively, injecting instructions into a web page may mean generating one or more new files with the new instructions and inserting and/or appending one or more references to the one or more new files in the web page and/or file.

Injection logic 336 may send and/or store data in bot check logic 340 and/or storage 240 indicating which identifier(s) and/or checkpoint(s) are defined in each section sent to each browser and/or client computer in one or more sessions. For example, in response to a request for a section of a web page for a particular session, injection logic 336 may generate a set of telemetry instructions that define a session identifier, a section identifier, and/or one or more mandatory checkpoints, optional checkpoints, and/or negative checkpoints.

Injection logic 336 may generate and/or send one or more valid checkpoint tokens that correspond to the one or more checkpoints to bot check logic 340 and/or storage 240. Injection logic 336 may associate each of the one or more valid checkpoint tokens with the session identifier and/or the section identifier, and send data describing the associations to bot check logic 340 and/or storage 240. Accordingly, injection logic 336 may inject telemetry instructions into a section, which when executed by a browser may cause the browser to send the section identifier and/or session identifier to intermediary computer 320 along with the telemetry data generated by the browser.

Additionally or alternatively, injection logic 336 may encrypt the one or more valid checkpoint tokens and embed the encrypted checkpoint tokens in telemetry instructions in a section that includes the corresponding checkpoints. When a browser generates and sends one or more checkpoint tokens to intermediary computer 230, the browser may also send the one or more encrypted valid checkpoint tokens for bot check logic 340 to decrypt and use to determine whether one or more checkpoint tokens generated by the browser are valid.

Injection logic 336 may further protect sections, web pages, and/or server computers using one or more countermeasures according to one or more countermeasure protocols stored in configuration 232, data structures in memory, and/or any other data, inputs, and/or factors. For example, injection logic 336 may protect one or more objects in a section using polymorphism according to one or more polymorphic protocols stored in configuration 232, data structures in memory, and/or any other data, inputs, and/or factors.

Injection logic 336 may add checkpoints to one or more of objects modified according to the polymorphic protocol, which may be used to determine whether the polymorphic protocol is changing all instances of an object and/or is being enforced. For example, injection logic 336 may change an object identifier for a particular object in a section according to a polymorphic protocol in configuration 232. Injection logic 336 may create a checkpoint for the object using the original identifier, such that if a browser tries to interact with the original object by the original identifier, then browser will reach the checkpoint. If bot check logic 340 receives a valid checkpoint token that corresponds with the checkpoint, then intermediary computer may determine that the polymorphic protocol may be breaking one or more features in the section and/or the browser is a bot.

4.2.4 Protocol Server Logic

Protocol server logic 338 may receive the instructions generated by injection logic 336 and send the generated instructions to client computer 299. Additionally or alternatively, protocol server logic 338 may intercept requests from client computer 299 and forward the requests to bot check logic 340.

4.2.5 Bot Check Logic

Bot check logic 340 may receive the results from one or more checkpoints and determine whether the browser that sent the results is a legitimate browser or a bot. For example bot check logic 340 may receive one or more session identifiers, section identifiers, and/or checkpoint tokens from a browser, and determine whether the checkpoint token(s) are valid for a corresponding session and/or section. Bot check logic 340 may determine which checkpoint token(s) are valid based on data received from injection logic 336 and/or data stored in storage 240. Additionally or alternatively, injection logic 336 may encrypt and send one or more valid checkpoint tokens in a set of telemetry instructions to a browser. In response to receiving one or more checkpoint tokens generated by the browser and the encrypted valid checkpoint token(s) from the browser, bot check logic 340 may determine whether the one or more checkpoint token generated by the browser are valid and/or whether the browser is a legitimate browser or a bot.

Bot check logic 340 may send data to web infrastructure 205, injection logic 336, and/or store data in storage 240, indicating whether a particular browser is a legitimate browser or a bot. Accordingly, if injection logic 336 receives data from bot check logic 340, and/or storage 240, indicating that a particular browser on a client computer is a legitimate browser, then injection logic 336 may inject fewer, if any, and/or less aggressive, browser-detection tests and/or countermeasures in future sections sent to the particular browser. If injection logic 336 receives data from bot check logic 340, and/or storage 240, indicating that a particular browser on a client computer is a bot, then injection logic 336 inject more, and/or more aggressive, browser-detection tests and/or countermeasures in future sections sent to the particular browser. Additionally or alternatively, injection logic 336 may stop sending sections to a particular browser if bot check logic 340 determines that the particular browser is a bot.

Checkpoints that cause a browser to perform operations may be configured to cause the browser to send the telemetry data to bot check logic 340 along with a request for data and/or one or more additional sections, or separately and/or asynchronously from a request for data and/or additional sections.

4.2.6 Reverse Logic

Reverse logic 342 may translate requests intercepted by protocol server logic 338, which are based on instructions generated by injection logic 336, into requests that would have been generated by browser 295 had browser 295 received the original instructions sent from web infrastructure 205. For example, if a request for a web page from browser 295 includes a checkpoint token, then reverse logic 342 may generate a new request for the web page that does not include the checkpoint token. Reverse logic 342 may send the new request to web infrastructure 205 through protocol client logic 332 on behalf of browser 295.

4.2.7 Configurations

Configuration 232 may be a database, a configuration file, and/or any other system that stores configurations: settings, preferences, and/or protocols. Configuration 232 may store more than one configuration for one or more web servers in web infrastructure 205. For example, configuration 232 may include data indicating whether or not one or more web pages from one or more server computers in web infrastructure 205 should be injected with telemetry instructions. Additionally or alternatively, configuration 232 may include data indicating that web pages from one or more server computers in web infrastructure 205 need not be injected with instructions that implement one or more countermeasures and/or other browser-detection tests.

Configuration 232 may be modified by a user and/or administrator through one or more computers, such intermediary computer 230, a computer in web infrastructure 205, and/or any other computer. The one or more computers may present the user with an interface that presents the user with a site map. The site map may comprise a graph, wherein the nodes correspond to pages and the edges between the nodes correspond to links. Intermediary computer 230 may generate a site map autonomously by intercepting web pages generated by web infrastructure 205 and intercepting requests based on data and/or links in the intercepted web pages from one or more browser computers.

The user may update configuration 232, through the interface, by selecting which sections, web pages, and/or objects to be "public" (need not have instructions that perform one or more browser-detection tests or countermeasures, such as telemetry instructions) and which sections, web page, and/or objects are "private" (may have instructions that perform one or more browser-detection tests or countermeasures, such as telemetry instructions). For example, the interface may receive input from a user indicating that a page is public. Configuration 232 may be updated accordingly.

The user may update configuration 232 to define one or more checkpoints and indicate which sections and/or objects the checkpoints should be based on. Additionally or alternatively, the user may define what checkpoint token components should be included in each checkpoint. For example, a user may update configuration 232 to define a checkpoint that should be included in a particular section and/or web page. Configuration 232 may indicate the order in which one or more checkpoints should be reached. Configuration 232 one or more other properties and/or states of a checkpoint, such as whether a checkpoint is mandatory, option, and/or negative for a particular section.

Additionally or alternatively, a user, such as a developer, that is creating and/or editing a web page in web infrastructure 205 may embed one or more tags and/or instructions in the web page defining one or more sections, checkpoints that should be added to the page, and/or the expected results. Injection logic 336 and/or processing logic 334 may parse the tags and/or instructions and generate the telemetry instructions and/or valid checkpoint tokens accordingly.

4.2.8 Storage

Storage 240 may store one or more expected results from one or more browsers, which may be used by intermediary computer 230. Additionally or alternatively, storage 240 may store data from bot check logic 340 indicating that a particular browser is a legitimate browser and/or a bot.

Storage 240 may be a database, a configuration file, and/or any other system and/or data structure that stores data. In FIG. 2, storage 240 is illustrated as if a separate computer from intermediary computer 230. Additionally or alternatively, storage 240 may be a data structure stored in memory on the one or more computers comprising intermediary computer 230. Additionally or alternatively, storage 240 may, at least in part, be a data structure stored in shared memory between one or more intermediary computers. Additionally or alternatively, intermediary computer 230 may, at least in part, be stored in volatile and/or non-volatile memory.

4.3 Browser

Browser 295 may be a browser as described herein and executed on a client computer, such as client computer 299. Additionally or alternatively, browser 295 may be a bot comprising one or more of the components traditionally found in a browser.

5.0 Process Overview

In an embodiment, a data processing method may be configured to intercept instructions from a server computer that are directed toward a browser, injection one or more instructions which when executed cause the client computer to perform and/or overcome one or more browser-detection tests, and/or countermeasures. In an embodiment, if results from the one more browser-detection instructions, such as telemetry instructions, indicate that a browser is a bot, and/or is more likely to be a bot then the processing method may be configured to inject one or more instructions, which when executed cause the browser to perform and/or overcome one or more additional and/or aggressive browser-detection tests and/or countermeasures, and/or send a response to a client computer. In an embodiment, if results from the one more browser-detection instructions indicate that a browser is a legitimate browser, and/or is more likely to be a legitimate browser, then the processing method may be configured to not inject instructions, which when executed by a browser cause the browser to perform and/or overcome one or more browser-detection tests and/or countermeasures. Various embodiments may use standard web protocols, such as HTTP, and/or standard web-based instructions, such as HTML and/or JavaScript. Additionally or alternatively, other standard and/or proprietary protocols may be used. Additionally or alternatively, other standard and/or proprietary instructions may be used.

5.1 Intercepting Instructions from a Content Server Computer

Figure 4:
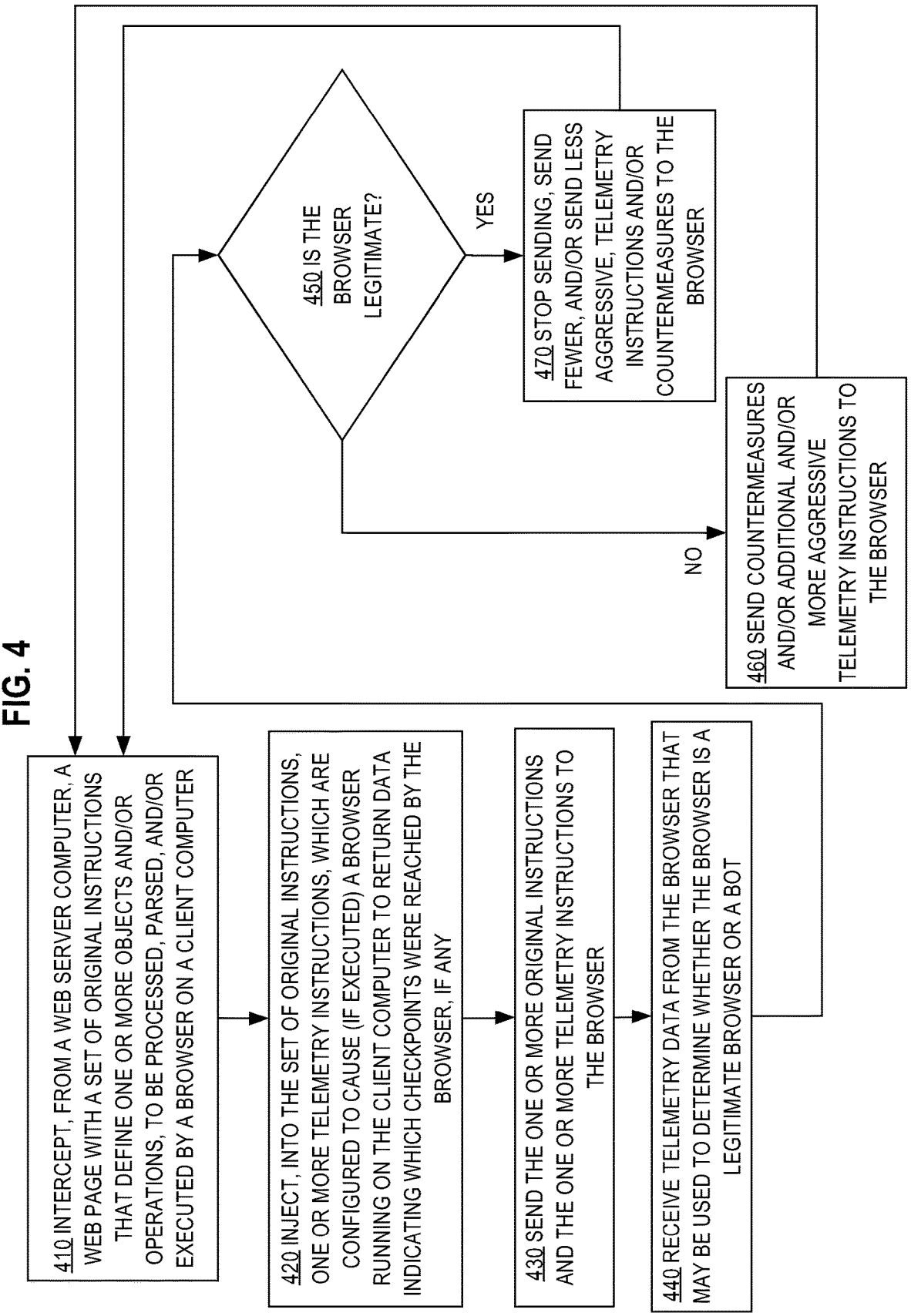
FIG. 4 illustrates a process for determining whether a browser is a legitimate browser or a bot, and adjusting the number of browser-detection tests and/or countermeasures used, in an example embodiment.

FIG. 4 illustrates a process for determining whether a browser is a legitimate browser or a bot, and adjusting the number of browser-detection tests and/or countermeasures used, in an example embodiment. In step 410, an intermediary computer intercepts, from a web server computer, a web page with a set of instructions that define one or more objects and/or operations, to be processed, parsed, and/or executed by a browser on a client computer. For example, protocol client logic 332 may receive a web page, such as unmodified HTML, JavaScript, and CSS 210, from web infrastructure 205. The web page may comprise HTML, CSS, JavaScript, and/or any other type of instructions.

5.2 Injecting Browser-Detection Tests

In step 420, the intermediary computer injects, into the set of original instructions, one or more telemetry instructions, which are configured to cause (if executed) a browser running on the client computer to return telemetry data indicating which checkpoints were reached, if any. For purposes of illustrating a clear example, assume that the web page received in the previous step comprises HTML, CSS, and JavaScript instructions. Processing logic 334 may parse the instructions. Injection logic 336 may inject one or more telemetry instructions into the web page, which when executed, cause the browser to reach one or more checkpoints. In this example, the telemetry instructions may be JavaScript instruction. However, telemetry instructions may be in one or more scripting language and/or programming language executable by a browser on a client computer. Injection logic 336 may generate a section identifier for the web page and/or a session identifier. Injection logic 336 may embed the section identifier and/or session identifier in the telemetry instructions. Injection logic 336 may generate one or more valid checkpoint tokens for each checkpoint. Injection logic may encrypt and/or embed the one or more valid checkpoint tokens in the telemetry instructions.

Additionally or alternatively, injection logic 336 may generate a new file with one or more telemetry instructions. Injection logic 336 may modify the section and/or web page to reference the new file. If a browser fails to request and/or download the new file, then intermediary computer 230 may determine that the browser is a bot. Additionally or alternatively, injection logic 336 may cache the new file. When a new web page is intercepted, injection logic may insert and/or append a reference and/or link in the web page that references the cached file. Additionally or alternatively, the cached file may be updated with new, different, and/or modified browser-detection tests over time. Accordingly an attacker may be required to continuously and/or frequently reverse engineer new and/or different checkpoints and/or checkpoint tokens.

For each negative checkpoint defined in a set of telemetry instructions, injection logic 336 may generate one or more checkpoint tokens that would be generated by a browser if the browser reached the negative checkpoint. Each negative checkpoint token may also include data indicating that the checkpoint is a negative checkpoint. Injection logic 336 may send the checkpoint tokens associated with negative checkpoints to storage 240 and/or bot check logic 340. Additionally or alternatively, injection logic may encrypt the negative checkpoint tokens and/or embed the negative checkpoint tokens into the telemetry instructions.

In step 430, the intermediary computer sends the one or more original instructions and the one or more telemetry instructions to the browser. For example, injection logic 336 may send the section and/or the injected telemetry instructions in step 420, which if FIG. 2 are label as modified HTML, JavaScript, and CSS 290, to browser 295 through protocol server logic 338.

5.3 Determining Whether a Browser is a Legitimate Browser or a Bot

In step 440, the intermediary computer receives telemetry data from the browser that may be used to determine whether the browser is a legitimate browser or a bot. For example, browser 295 may execute the injected telemetry instructions, reach one or more checkpoints, generate one or more checkpoint records and/or checkpoint tokens, and send the checkpoint records and/or checkpoint tokens to intermediary computer 230. The browser may also send a set of one or more embedded checkpoint tokens, which were embedded in the telemetry instructions, to intermediary computer 230. The data may be received by bot check logic 340 through protocol server logic 338.

In step 450, the intermediary computer determines whether the browser is a legitimate browser or a bot. If bot check logic 340 determines that a browser is a bot, and/or is more likely to be a bot, then control may pass to step 460. If bot check logic 340 determines that a browser is a legitimate browser, and/or is more likely to be a legitimate browser, then control may pass to step 470. For example, bot check logic 340 may retrieve the section identifier and/or session identifier from in the telemetry data received in step 440. Bot check logic 340 may retrieve the valid checkpoint token(s) in storage 240. Additionally or alternatively bot check logic 340 may retrieve the valid checkpoint token(s) from the telemetry data, which was original embedded in the telemetry instructions that cause the browser to generate the telemetry data. Based on one or more checkpoint tokens received, bot check logic 340 may determine whether the browser is a legitimate browser, a browser is a bot. Additionally or alternatively, bot check logic 340 may determine a value that indicates whether that the browser is likely a legitimate browser or a bot. If bot check logic 340 determines that a browser is a bot, and/or is more likely to be a bot, then control may pass to step 460. If bot check logic 340 determines that a browser is a legitimate browser, and/or is more likely to be a legitimate browser, then control may pass to step 470.

There are many way bot check logic 340 may determine whether a browser is a legitimate browser or a bot. For example, for each mandatory checkpoint associated with the section identifier and/or session identifier received in the telemetry data, bot check logic 340 may verify that browser 295 generated a valid checkpoint token that corresponds with the mandatory checkpoint. If bot check logic 340 receives a valid checkpoint token for each mandatory checkpoint, then bot check logic 340 may determine that browser 295 is a legitimate browser; otherwise, bot check logic 340 may determine that browser 295 is a bot.

Additionally or alternatively, for each negative checkpoint associated with the section identifier and/or session identifier received in the telemetry data, bot check logic 340 may verify that browser 295 did not send a checkpoint record and/or a checkpoint token that corresponds with the negative checkpoint. If bot check logic 340 does not receive any checkpoint tokens that correspond to a negative checkpoint, then bot check logic 340 may determine that browser 295 is a legitimate browser; otherwise, bot check logic 340 may determine that browser 295 is a bot.

Additionally or alternatively, for each checkpoint token received from browser 295 that corresponds to an optional checkpoint associated with the section identifier and/or session identifier received in the telemetry data, bot check logic 340 may verify that browser 295 generated a valid checkpoint token. If bot check logic 340 determines that each optional checkpoint token is valid, then bot check logic 340 may determine that browser 295 is a legitimate browser; otherwise, bot check logic 340 may determine that browser 295 is a bot.

5.3.1 Validating a Checkpoint Token

Validating a checkpoint token may mean determining that a checkpoint token corresponds to an actual checkpoint defined in the telemetry instructions, and/or that each component in the checkpoint token is valid and/or matches a predicted and/or pre-computed checkpoint token and/or checkpoint token component. For example, if a checkpoint token includes an ordered checkpoint token component and the value of the ordered checkpoint token component does not match a pre-generated value by injection logic 336, then bot check logic 340 may determine that the checkpoint was reached out of order, if at all, and is invalid; otherwise, bot check logic 340 may determine that the checkpoint token is valid.

If a checkpoint token includes a state-dependent checkpoint token component and does not match a pre-generated state and/or value based on a predicted state, then bot check logic 340 may determine that the checkpoint was reached, but the state of the browser was not valid and/or the checkpoint token is invalid. Otherwise, bot check logic 340 may determine that the checkpoint token is valid.

If a checkpoint token includes the same "random" value for a random checkpoint token component as one or more previously received and/or processed checkpoint tokens from the same browser, then bot check logic 340 may determine that the checkpoint token is invalid. Otherwise, bot check logic 340 may determine that the checkpoint token is valid.

If a checkpoint token includes a scoped checkpoint token component does not match and/or correspond to a section identifier associated with the checkpoint and/or checkpoint token, then bot check logic 340 may determine that the checkpoint token is invalid. Otherwise, bot check logic 340 may determine that the checkpoint token is valid.

If a randomized checkpoint token indicates a checkpoint token should be offset by a particular number of bits in the corresponding checkpoint record and the checkpoint token is not offset by the particular number of bits, then bot check logic 340 may determine that the checkpoint token is invalid. Otherwise, bot check logic 340 may determine that the checkpoint token is valid.

5.3.2 Determining a Likelihood that a Browser is a Legitimate Browser or a Bot

Bot check logic 340 may determine a likelihood that browser 295 is a legitimate browser or a bot. For example, for each optional checkpoint token received from browser 295 and associated with the section identifier and/or session identifier, bot check logic 340 may determine whether that browser 295 generated a valid checkpoint token. The likelihood that browser 295 is a legitimate browser may be the ratio of valid optional checkpoint tokens that bot check logic 340 received from browser 295 compared to the total number of optional checkpoint tokens that bot check logic 340 received from browser 295.

5.3.3 Updating the Status of a Checkpoint

Bot check logic 340 may record how frequently a particular checkpoint is reached by one or more browsers and how frequently the checkpoint is determined to be valid or not. Bot check logic 340 may store the frequency data in storage 240.

A user, such as an administrator for web infrastructure 205, may review the frequency data for a checkpoint in a section and update configuration 232 to change the status of the checkpoint to a mandatory checkpoint, optional checkpoint, or negative checkpoint. For purposes of illustrating a clear example, assume bot check logic 340 stores data in storage 240 indicating that a particular optional checkpoint in a particular section is reached 100% of the time that a legitimate browser receives the section. In response to the data, a user may update configuration 232 to indicate that the checkpoint is now a mandatory checkpoint. For purposes of illustrating another clear example, assume bot check logic 340 stores data in storage 240 indicating that a particular optional checkpoint in a particular section is reached 0% of the time that a legitimate browser receives the section. In response to the data, a user may update configuration 232 to indicate that the checkpoint is now a negative checkpoint.

If bot check logic 340 receives browser-detection test results from a browser and is unable to find matching and/or expected result, then the intermediary computer may determine that the browser is a bot, and/or is more likely to be a bot. Additionally or alternatively, bot check logic 340 may store the results in storage 240. An administrator may review the results and determine whether the other browsers that generate the same detection test results should be classified as a legitimate browser or a bot.

5.4 Responding to a Browser that is Determined to be a Bot

In step 460, the intermediary computer sends additional and/or more aggressive browser-detection tests and/or countermeasures to the browser. For example, intermediary computer 230 may stop responding to requests for data from browser 295. Additionally or alternatively, injection logic 336 send one or more instructions, which when executed, cause the browser to write particular and/or substantial amount of data to persistent storage, which may hamper and/or stop the bot from executing on the client computer.

More invasive browser-detection tests may be reserved for browsers that bot check logic 340 determines to be more likely a bot than a legitimate browser. For example, injection logic 336 may send browser 295 one or more other browser-detection instructions, which when executed, cause browser 295 to present an alert and/or popup that a user may suppress, and report back to intermediary computer 230 how much time elapsed from when the alert was presented until the alert was suppressed. A bot may never suppress an alert because the bot need not include a user interface. However, a user may take between one to five seconds to read and suppress the alert. Causing an alert to be presented to a user may interrupt the work flow of a web page, web site, and/or a user. A browser-detection test that interrupts the work flow of a web page, web site, and/or a user may be deemed a more invasive browser-detection test than other tests.

Bot check logic 340 may record data in storage 240 indicating that browser 295 is a bot. For example, bot check logic 340 may record the IP address, mac address, and/or any other identifier for browser 295 in storage 240 and associating data with the identifier that indicates browser 295 is a bot. Additionally or alternatively, bot check logic 340 may record, in storage 240, and/or identify a browser using a browser fingerprint comprising a string bits and/or other values generated by one or more instructions executed by the browser. Additionally or alternatively, bot check logic 340 may record data in storage 240 indicating how likely a browser is a legitimate browser or a bot.

Injection logic 336 may send additional browser-detection tests and/or countermeasures to browser 295 by injecting the additional browser-detection tests and/or countermeasures into subsequently intercepted web pages from web infrastructure 205 that are intended for browser 295. Additionally or alternatively, injection logic 336 may asynchronously send additional browser-detection tests and/or countermeasures to browser 295 using AJAX, Web Sockets, and/or another language and/or protocol. In an embodiment, an intermediary computer may, but need not, inject countermeasures into a section that is sent to a particular browser on a particular client computer, until after the intermediary computer determines that a particular browser is, and/or is more likely to be, a bot.

In an embodiment, if the intermediary computer has sent telemetry instructions to a client computer and/or browser, but has not received valid telemetry data, then the intermediary computer need not respond to further requests for data and/or sections. Additionally or alternatively, the intermediary computer need not forward a request for data to a server computer in web infrastructure 205 if the intermediary computer has sent telemetry instructions to a client computer and/or browser and has not received valid telemetry data in response.

5.5 Responding to a Browser that is Determined to be a Legitimate Browser

In step 470, the intermediary computer may stop sending, send fewer, and/or send less aggressive, browser-detection tests and/or countermeasures to the browser. For example, if browser 295 is determined to be a legitimate browser, injection logic 336 may stop injecting browser-detection tests, such as telemetry instructions, into section sent browser 295.

In an embodiment, in response to determining browser 295 is more likely to be a legitimate browser, and before ceasing to inject countermeasures into web pages sent to browser 295, injection logic 336 may send one or more aggressive browser-detection tests. If browser 295 sends valid results, such as valid mandatory checkpoint tokens, then injection logic 336 may stop injecting browser-detection tests and/or countermeasures into sections and/or web pages sent to browser 295 for at least a particular amount of time.

6.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
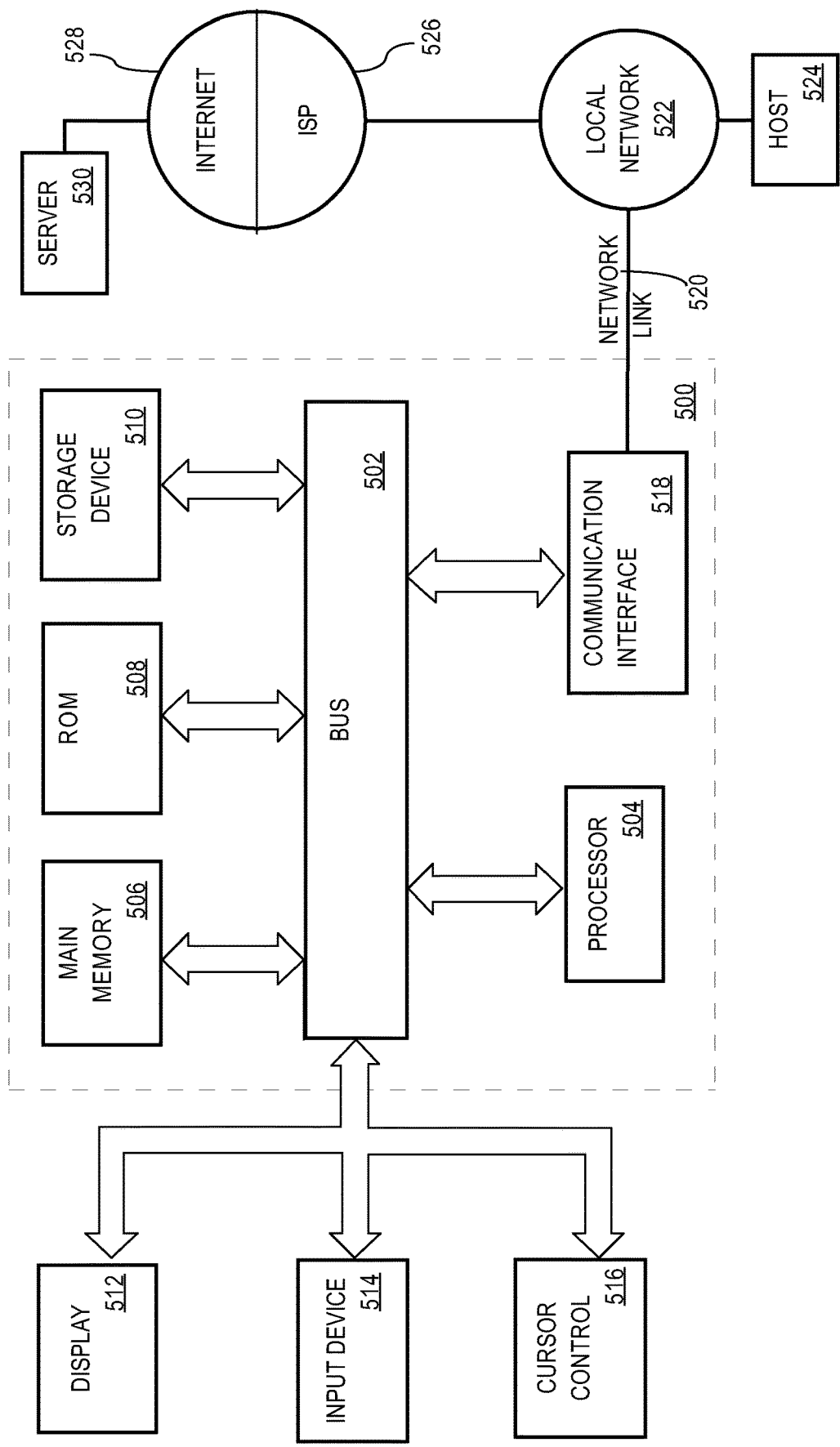
FIG. 5 illustrates a computer system upon which an embodiment may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

7.0 Other Aspects of Disclosure

Using the networked computer arrangements, intermediary computer, and/or processing methods described herein, security in client-server data processing may be significantly increased. Polymorphic techniques discussed herein effectively reduce automated attacks. Consequently, one or more various attacks, such as a denial of service ("DOS") attack, credential stuffing, fake account creation, ratings or results manipulation, man-in-the-browser attacks, reserving rival goods or services, scanning for vulnerabilities, and/or exploitation of vulnerabilities, are frustrated because object identifiers and/or polymorphic hooks may change over time.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for improving security of a server computer interacting with a client computer, the method comprising:
sending a set of one or more instructions to a browser at a client computer, wherein the set of one or more instructions define one or more checkpoints, wherein each checkpoint generates telemetry data indicating a state of the browser at a time when the checkpoint was reached by the browser;

receiving a set of telemetry data from the browser at the client computer, the set of telemetry data comprising telemetry data generated by one or more particular checkpoints of the one or more checkpoints;

determining, based on the set of telemetry data, whether the browser is legitimate or illegitimate.

2. The method of claim 1, wherein each checkpoint corresponds to a particular method, and the telemetry data generated by the checkpoint further indicates that the method was executed.

3. The method of claim 1, wherein each checkpoint corresponds to a particular object, and the telemetry data generated by the checkpoint further indicates whether the browser interacted with the particular object.

4. The method of claim 1, wherein each checkpoint corresponds to a particular object, and the telemetry data generated by the checkpoint further indicates a state of the particular object.

5. The method of claim 1, wherein the telemetry data generated by the checkpoint further indicates how the checkpoint was reached by the browser.

6. The method of claim 1, wherein the telemetry data generated by the checkpoint further indicates a scope in which the checkpoint was reached.

7. The method of claim 1, wherein the set of telemetry data indicates an order in which the one or more particular checkpoints were reached by the browser.

8. The method of claim 1, further comprising:
in response to determining the browser is legitimate:
storing a set of identification data that identifies the browser and indicates that the browser is legitimate;
receiving a request for additional data from the browser;
determining from the set of identification data that the browser is legitimate, and in response, sending one or more new instructions without additional telemetry instructions.

9. The method of claim 1, further comprising:
in response to determining the browser is illegitimate:
storing a set of identification data that identifies the browser and indicates that the browser is illegitimate;
receiving a request for additional data from the browser;
determining from the set of identification data that the browser is illegitimate, and in response, sending one or more new instructions with one or more new browser-detection instructions.

10. The method of claim 1, further comprising:
in response to determining the browser is illegitimate:
storing a set of identification data that identifies the browser and indicates that the browser is illegitimate;
receiving a request for additional data from the browser;
determining from the set of identification data that the browser is illegitimate, and in response, terminating the request.

11. A computer system configured to improve security of server computers interacting with client computers, the computer system comprising:
a memory;
one or more processors coupled to the memory;
a processor logic coupled to the memory and the one or more processors, and programmed to:
send a set of one or more instructions to a browser at a client computer, wherein the set of one or more instructions define one or more checkpoints, wherein each checkpoint generates telemetry data indicating a state of the browser at a time when the checkpoint was reached by the browser;
receive a set of telemetry data from the browser at the client computer, the set of telemetry data comprising telemetry data generated by one or more particular checkpoints of the one or more checkpoints;
determine, based on the telemetry data, whether the browser is legitimate or illegitimate.

12. The computer system of claim 11, wherein each checkpoint corresponds to a particular method, and the telemetry data generated by the checkpoint further indicates that the method was executed.

13. The computer system of claim 11, wherein each checkpoint corresponds to a particular object, and the telemetry data generated by the checkpoint further indicates whether the browser interacted with the particular object.

14. The computer system of claim 11, wherein each checkpoint corresponds to a particular object, and the telemetry data generated by the checkpoint further indicates a state of the particular object.

15. The computer system of claim 11, wherein the telemetry data generated by the checkpoint further indicates how the checkpoint was reached by the browser.

16. The computer system of claim 11, wherein the telemetry data generated by the checkpoint further indicates a scope in which the checkpoint was reached.

17. The computer system of claim 11, wherein the set of telemetry data indicates an order in which the one or more particular checkpoints were reached by the browser.

18. The computer system of claim 11, wherein the processor logic is further programmed to:
in response to determining the browser is legitimate:
store a set of identification data that identifies the browser and indicates that the browser is legitimate;
receive a request for additional data from the browser;
determine from the set of identification data that the browser is legitimate, and in response, send one or more new instructions without additional telemetry instructions.

19. The computer system of claim 11, wherein the processor logic is further programmed to:
in response to determining the browser is illegitimate:
store a set of identification data that identifies the browser and indicates that the browser is illegitimate;
receive a request for additional data from the browser;
determine from the set of identification data that the browser is illegitimate, and in response, send one or more new instructions with one or more new browser-detection instructions.

20. The computer system of claim 11, wherein the processor logic is further programmed to:
in response to determining the browser is illegitimate:
store a set of identification data that identifies the browser and indicates that the browser is illegitimate;
receive a request for additional data from the browser;
determine from the set of identification data that the browser is illegitimate, and in response, terminate the request.

* * * * *